(12) United States Patent
Libman et al.

(10) Patent No.: US 9,332,591 B2
(45) Date of Patent: May 3, 2016

(54) RF HEATING AT SELECTED POWER SUPPLY PROTOCOLS

(71) Applicant: GOJI LIMITED, Hamilton (BM)

(72) Inventors: Avner Libman, Holon (IL); Steven Robert Rogers, D.N. Emek Sorek (IL); Caroline Myriam Rachel Obadia, Ashdod (IL)

(73) Assignee: GOJI LIMITED, Hamilton (BM)

( * ) Notice: Subject to any disclaimer, the term of this patent is extended or adjusted under 35 U.S.C. 154(b) by 0 days.

(21) Appl. No.: 14/697,903

(22) Filed: Apr. 28, 2015

(65) Prior Publication Data

US 2015/0245423 A1    Aug. 27, 2015

Related U.S. Application Data

(63) Continuation of application No. 13/759,142, filed on Feb. 5, 2013, now Pat. No. 9,040,879.

(60) Provisional application No. 61/595,399, filed on Feb. 6, 2012, provisional application No. 61/595,413, filed on Feb. 6, 2012.

(51) Int. Cl.
*H05B 1/02* (2006.01)
*H05B 6/00* (2006.01)
(Continued)

(52) U.S. Cl.
CPC .. *H05B 1/02* (2013.01); *H05B 6/00* (2013.01); *H05B 6/68* (2013.01); *H05B 6/686* (2013.01); *H05B 6/70* (2013.01); *Y02B 40/143* (2013.01)

(58) Field of Classification Search
CPC ........ Y02B 40/143; H05B 6/686; H05B 6/70; H05B 6/705; H05B 7/72; H05B 6/52; H05B 6/64
USPC ......... 219/485, 486, 701, 702, 746, 748, 697, 219/691, 707; 426/87
See application file for complete search history.

(56) References Cited

U.S. PATENT DOCUMENTS

| 2,895,828 A | 7/1959 | Kamide |
| 4,196,332 A | 4/1980 | MacKay B et al. |

(Continued)

FOREIGN PATENT DOCUMENTS

| EP | 0296527 | 12/1988 |
| EP | 1174667 A1 | 1/2002 |

(Continued)

OTHER PUBLICATIONS

Office Action in U.S. Appl. No. 13/759,166, dated Sep. 26, 2014.
(Continued)

*Primary Examiner* — Mark Paschall
(74) *Attorney, Agent, or Firm* — Greenblum & Bernstein, P.L.C.

(57) ABSTRACT

An apparatus is provided for applying electromagnetic energy to an object in an energy application zone via one or more antennas at a plurality of modulation space elements (MSEs), in which each MSE may affect a field pattern excited in the energy application zone and is controllable by the apparatus. The apparatus includes a processor that determines an amount of energy to be supplied to one or more of the antennas at each of the plurality of MSEs, select at least one power supply protocol for each of the plurality of MSEs, in which at least two of the power supply protocols selected for different MSEs differ, and cause electromagnetic power supply to one or more of the antennas in at least a subset of the plurality of MSEs, based on the determined amount of energy and based on the selected power supply protocol.

13 Claims, 15 Drawing Sheets

(51) Int. Cl.
*H05B 6/68* (2006.01)
*H05B 6/70* (2006.01)

(56) References Cited

U.S. PATENT DOCUMENTS

| | | | |
|---|---|---|---|
| 4,415,789 A | 11/1983 | Nobue et al. |
| 4,883,944 A | 11/1989 | Takano et al. |
| 4,939,331 A | 7/1990 | Berggren et al. |
| 5,008,506 A | 4/1991 | Asmussen et al. |
| 6,346,693 B1 | 2/2002 | Kasevich |
| 6,403,939 B1 | 6/2002 | Fagrell |
| 6,680,467 B1 | 1/2004 | Whipple, Jr. |
| 6,720,540 B2 | 4/2004 | Fagrell |
| 7,994,962 B1 | 8/2011 | Ben-Shmuel |
| 8,653,482 B2 | 2/2014 | Ben-Shmuel |
| 8,839,527 B2 | 9/2014 | Ben-Shmuel et al. |
| 9,040,879 B2 | 5/2015 | Libman et al. |
| 2002/0157411 A1 | 10/2002 | Ishikawa et al. |
| 2002/0175163 A1 | 11/2002 | Fagrell |
| 2004/0173604 A1 | 9/2004 | Fagrell |
| 2004/0206755 A1 | 10/2004 | Hadinger |
| 2007/0039949 A1 | 2/2007 | Wilson |
| 2008/0047948 A1 | 2/2008 | Rosenbloom et al. |
| 2008/0290087 A1 | 11/2008 | Ben-Shmuel et al. |
| 2009/0045191 A1 | 2/2009 | Ben-Shmuel et al. |
| 2009/0057302 A1 | 3/2009 | Ben-Shmuel et al. |
| 2009/0236334 A1 | 9/2009 | Ben-Shmuel et al. |
| 2010/0176123 A1 | 7/2010 | Mihara et al. |
| 2010/0224623 A1 | 9/2010 | Yasui et al. |
| 2011/0108548 A1 | 5/2011 | Nobue et al. |
| 2011/0168699 A1 | 7/2011 | Oomori et al. |
| 2012/0097669 A1 | 4/2012 | Sim et al. |
| 2012/0312801 A1 | 12/2012 | Bilchinsky et al. |
| 2013/0080098 A1 | 3/2013 | Hadad et al. |
| 2013/0087545 A1 | 4/2013 | Bilchinsky et al. |
| 2013/0146590 A1 | 6/2013 | Einziger et al. |
| 2013/0200066 A1 | 8/2013 | Gelbart et al. |
| 2013/0206749 A1 | 8/2013 | Libman et al. |
| 2013/0306627 A1 | 11/2013 | Libman et al. |
| 2013/0334214 A1 | 12/2013 | Yogev et al. |
| 2014/0247060 A1 | 9/2014 | Ben Haim et al. |
| 2014/0287100 A1 | 9/2014 | Libman |

FOREIGN PATENT DOCUMENTS

| | | |
|---|---|---|
| EP | 2051564 A1 | 4/2009 |
| JP | 52-014946 | 2/1977 |
| JP | 1-159388 U1 | 11/1989 |
| JP | 04-259789 | 9/1992 |
| JP | 7-18553 B2 | 3/1995 |
| JP | 10-196966 | 7/1998 |
| JP | 2001-317741 A2 | 11/2001 |
| JP | 2002-280159 | 9/2002 |
| JP | 2002-532239 | 10/2002 |
| JP | 2008-34244 A | 2/2008 |
| JP | 2008-269793 A | 11/2008 |
| JP | 2009-259511 A | 11/2009 |
| WO | 91/07069 A1 | 5/1991 |
| WO | 00/36880 | 6/2000 |
| WO | 02/23953 A1 | 3/2002 |
| WO | 2007/096877 A2 | 8/2007 |
| WO | 2008/007368 | 1/2008 |
| WO | 2009/050893 A1 | 4/2009 |
| WO | 2010/052723 | 5/2010 |
| WO | 2010/052724 | 5/2010 |
| WO | 2011/010799 | 1/2011 |
| WO | 2011/058537 | 5/2011 |
| WO | 2011/058538 | 5/2011 |
| WO | 2012/001523 | 1/2012 |
| WO | 2012/066419 | 5/2012 |
| WO | 2013/003330 | 3/2013 |

OTHER PUBLICATIONS

Final Office Action in U.S. Appl. No. 13/759,166, dated Mar. 13, 2015.
Notice of Allowance in U.S. Appl. No. 13/759,166, dated Jun. 8, 2015.
Abstract of U.S. 2002/0157411 of Oct. 31, 2002.

RF HEATING AT SELECTED POWER SUPPLY PROTOCOLS

RELATED APPLICATIONS

This application is a continuation application of co-pending U.S. patent application Ser. No. 13/759,142, filed Feb. 5, 2013, which claims the benefit of U.S. Provisional Patent Application Nos. 61/595,399 and 61/595,413, both of which were filed on Feb. 6, 2012. Both of these provisional applications are fully incorporated herein by reference. The present application also relates to U.S. Nonprovisional Patent Application entitled "METHODS AND DEVICES FOR APPLYING RF ENERGY ACCORDING TO ENERGY APPLICATION SCHEDULES," filed Feb. 5, 2013, which is fully incorporated herein by reference.

TECHNICAL FIELD

This is a U.S. patent application relating to a device and method for applying electromagnetic energy to an energy application zone, and more particularly, but not exclusively, to such a device and method for controlling the energy application based on feedback from the energy application zone.

BACKGROUND

Electromagnetic waves have been used in various applications to supply energy to objects. In the case of radio frequency (RF) radiation, for example, electromagnetic energy may be supplied using a magnetron, which is typically tuned to a single frequency for supplying electromagnetic energy only in that frequency. One example of a commonly used device for supplying electromagnetic energy is a microwave oven. Typical microwave ovens supply electromagnetic energy at or about a single frequency of 2.45 GHz.

SUMMARY OF A FEW EXEMPLARY ASPECTS OF THE DISCLOSURE

The present invention, in some embodiments thereof, relates to methods and apparatuses for applying RF energy to an object in an energy application zone via one or more radiating elements. The energy may be applied at different frequencies, and an amount of energy to be applied at each frequency may be determined, e.g., based on electromagnetic feedback received from the energy application zone. The electromagnetic feedback may include, for example, power measurement results or other measurement results that may be indicative of the electromagnetic response of the energy application zone and the object to the applied electromagnetic energy. In some embodiments, some or all of the feedback may be received via one or more of the radiating elements. Optionally, the electromagnetic feedback may include values indicative of energy absorbable in the object and/or data allowing estimation of such values. Electromagnetic feedback may include network parameters (for example, S parameters), reflection parameters (for example, gamma (Γ) parameters), and various combinations thereof (for example, dissipation ratio).

In some embodiments, the amount of energy determined to be applied at a particular frequency may be supplied to one or more of the radiating elements according to a power supply protocol. A power supply protocol may include any rule that relates to or determines the time duration and/or power level at which energy is applied at the particular frequency. In some embodiments, a power supply protocol may delimit the time duration and/or power level at which energy is applied at the particular frequency. Additionally or alternatively, a power supply protocol may include a time distribution of the power during an energy application event. In some embodiments, an energy application event may be defined as the time between commencement of energy application at one frequency and the commencement of energy application at another frequency. In some embodiments, an energy application event may be defined as the time between ending energy application at one frequency and ending energy application at another frequency. Generally, an energy application event may refer to the time duration for which a single power supply protocol provides power supply instructions.

In some embodiments, at least one power supply protocol may be selected for each frequency from a plurality of protocols. This selection may result in using the same protocol for one, some, or all of the frequencies.

Any suitable power supply protocol may be used depending on the requirements of a particular application. In a first example, a power supply protocol may include a rule that energy is to be supplied at a predetermined power level, $P_0$. Using this rule, a determined amount of energy E may be supplied by supplying power at level $P_0$ for a time duration of $E/P_0$ (by definition, power corresponds to energy per unit time).

In some embodiments, selection of a power supply protocol may include selection from a group of protocols that differ from each other in a value of a single parameter. For example, selecting a protocol may include selection between two protocols that differ in the value of $P_0$. In some embodiments, selecting may be between protocols that differ in the parameter, the value of which may be dictated by the protocol. For example, selection may occur between a protocol that involves a constant power and a protocol that involves a constant time. In some embodiments, selection may be between protocols that differ both in parameters and in values.

In another example, a second power supply protocol may include a rule that energy is to be applied at a predetermined time period $t_0$. Using this rule, a determined amount of energy E may be supplied by supplying power at level $E/t_0$ for time duration of $t_0$.

In some embodiments, a power supply protocol may be selected according to the amount of energy determined to be applied. For example, a first protocol may be selected when E is large (e.g. larger than a threshold), and a second protocol may be selected when E is small (e.g. smaller than the same or other threshold). In some embodiments, the first protocol may be selected when E is larger than the multiplicative product of $P_0$ and $t_0$ (i.e. if $E > P_0 \cdot t_0$); and the second protocol may be selected when E is smaller than the multiplicative product of $P_0$ and $t_0$, i.e., if $E \leq P_0 \cdot t_0$.

Such a selection of power supply protocols may be suitable, for example, if there is a limit to the rate at which the hardware may supply power at level $P_0$. If, for example, the hardware cannot supply power at level $P_0$ for a duration shorter than $t_0$, it may be advantageous to allow more time for applying smaller amounts of energy, and this may be achieved with the second protocol. The power used in the second protocol may be lower than that used by the first protocol. However, if there is no reason to allow at least a time period of $t_0$ for supplying the determined amount of energy, the first protocol may be solely used, because it may lead to supplying same amounts of energy at shorter times.

In another example, a third power supply protocol may include a rule to supply power at a level of $q \ast P_{max}$, where q is a constant fraction (i.e. between 0 and 1), and $P_{max}$ is the maximal power the hardware may supply. $P_{max}$ may be frequency-dependent.

Selection of this power supply protocol with q=1 may ensure the highest possible time-efficiency of energy delivery, and thus, may allow shortening the total time for delivering a predetermined amount of energy to the object.

The use of this protocol with q<1 may be suitable, for example, if the object cannot absorb the amount of energy E during a period as short as $E/P_{max}$, or if such absorption has adverse side effects, for example, development of undesired hot spots.

In some embodiments, selecting this power supply protocol with q<1 for a given frequency may be suitable when there is a maximum limit to the desired absorbed power $p_{max}^{abs}$ for the given frequency, and supplying energy at $P_{max}$ may result in absorbing power that exceeds $p_{max}^{abs}$. In some embodiments, the absorbed power may be estimated as the multiplicative product of the supplied power by a dissipation ratio DR or other value indicative of energy absorbable in the object, as discussed in more detail below. As discussed below, DR may have a value between zero and one. Thus, in some embodiments, the third power supply protocol may be selected for frequencies at which $P_{max} \cdot DR > p_{max}^{abs}$. In some embodiments, the third power supply protocol with q<1 may be selected when DR is above a threshold, under a threshold, or between two threshold values. In some embodiments, selection of a protocol with a specific value of q may be made according to the value of DR, for example, a selection rule that $q=DR$, $q=\sqrt{1-DR^2}$, $q=1/DR$ or any other rule that relates q and DR. Such a selection rule (like most other selection rules) may be used for none, some, or all of the frequencies.

In a fourth example, a power supply protocol may include a rule to supply the determined amount of energy at a power level of $p_{max}^{abs}/DR$. The fourth power supply protocol may offer similar performance characteristics to the third protocol under certain circumstances. However, in certain circumstances, the fourth protocol may allow a more time-efficient energy delivery, while ensuring that the absorbed power equals to $p_{max}^{abs}$, and does not exceed it.

In a fifth example, a power supply protocol may provide a duty cycle smaller than 100%. Such a power supply protocol may allow time for equilibration of heat inside and across the object. A power supply protocol of this kind may also determine a temporal power spectrum, determining when power is applied and when not; and optionally also the power level, at which power is supplied at each instance.

In some embodiments, a power supply protocol pertaining to a duty cycle may also include, for example, a time delay before and/or after energy application, an average power level, a peak power level, or any other parameter that determines the details of power supply.

The Invention is not limited to any particular power supply protocol, and the above examples, as well as the examples provided below, are provided merely for illustration of various embodiments.

Furthermore, the invention is not limited to energy application at different frequencies. Rather, the energy may be applied at different modulation space elements (MSEs). A modulation space element may include any set of one or more values, each of a controllable variable that may affect a field pattern excited in the energy application zone. One such variable is the frequency, and an MSE may include a value of a frequency (e.g. 922 MHz, 2450 MHz, or any other value). Another such variable may be a phase difference between waves emitted by two radiating elements, and an MSE may include a value of such phase difference (e.g. 10°, 20°, or any other value). An MSE may also include a set of more than one value, for example, it may be a set of one frequency value and one phase value, etc. A more detailed discussion of the MSE concept is provided below.

In view of the above discussion and examples, it may be understood that some aspects of the invention may be embodied in an apparatus for applying electromagnetic energy to an object in an energy application zone via one or more radiating elements at a plurality of modulation space elements (MSEs). The apparatus may include at least one processor, which may be configured to determine an amount of energy to be supplied to one or more of the radiating elements at each of the plurality of MSEs; select at least one power supply protocol for each of the plurality of MSEs, and cause electromagnetic power supply to one or more of the radiating elements in at least a subset of the plurality of MSEs, based on the determined amount of energy and based on the selected power supply protocol. The protocol may include a rule that delimits or determines power level(s) and/or energy application duration(s) at which the determined amounts of energy may be supplied.

In some embodiments, the at least one processor may be further configured to determine a value indicative of energy absorbable by the object at each of the plurality of MSEs, and determine the amount of energy and/or the power supply protocol based on that value.

In some embodiments, the power supply protocol may include a time delay applied between application of energy at a first MSE and application of energy at a second MSE. The first and second MSEs may be within the subset of the plurality of MSEs. Energy may be applied at a second MSE before or after energy is applied at the first.

In some embodiments, the power supply protocol may include a maximum absorbed power limit. In some embodiments, selection may be made between protocols determining different limits to the maximum power absorbed. For example, different maximum power absorbed limits may be selected for different MSEs. The maximum absorbed power limit may be related to a multiplicative product of applied power and a value indicative of energy absorbable by the object. For example, the maximum absorbed power limit may be equal to this multiplicative product. Optionally, the processor may be configured to cause supply of electromagnetic energy to one or more of the radiating elements such that the maximum absorbed power limit is not exceeded for any of the MSEs, for which a power supply protocol defining the maximum power absorbed limit was selected.

In some embodiments, protocols dictating different maximum absorbed power limits may be selected for different MSEs in the subset, and the processor may be configured to cause supply of electromagnetic power to one or more of the radiating elements such that the maximum absorbed power limits determined for different MSEs in the subset are not exceeded for any of the subset of the plurality of MSEs.

In some embodiments, the power supply protocol may include a minimum energy application time limit. In some embodiments, selection may be made between protocols determining different energy application time limits. For example, different energy application time limits may be selected for different MSEs.

Optionally, the processor may be configured to cause supply of electromagnetic power to one or more of the radiating elements in at least a subset of the plurality of MSEs such that the minimum energy application time limit is not exceeded for any of the subset of the plurality of MSEs.

In some embodiments, the minimum energy application time limit may be the same for all the MSEs in the subset. In some embodiments, protocols dictating different minimum energy application time limits may be selected for different MSEs in the subset, and the processor may be configured to cause supply of electromagnetic power to one or more of the radiating elements such that the minimum energy application time limits determined to different MSEs in the subset are not exceeded for any of the subset of the plurality of MSEs.

Thus, according to some embodiments of the invention, there is provided an apparatus for applying RF energy to an object in an energy application zone via one or more radiating elements at a plurality of modulation space elements (MSEs). The apparatus comprises at least one processor configured to cause supply of RF energy to one or more of the radiating elements in a first subset of the plurality of MSEs, at a first power level common to the MSEs in the first subset and for varying time durations, and cause supply of RF energy to one or more of the radiating elements in a second subset of the plurality of MSEs, at power levels lower than the first power level and for a time duration common to the MSEs of the second subset.

In some embodiments, each of the varying time durations is not shorter than the time duration common to the MSEs of the second subset of MSEs.

In some embodiments, each MSE is associated with an absorbability indicator, and the absorbability indicators associated with the MSEs of the first subset of MSEs are different from the absorbability indicators associated with MSEs of the second subset of MSEs.

In some embodiments, the at least one processor is configured to associate MSEs with absorbability indicators, and group the MSEs into the first subset and second subset based on the absorbability indicators associated with the MSEs.

In some embodiments, the apparatus may further include a detector configured to detect power exiting from the energy application zone, and determine an absorbability indicator for each MSE based on readings of the detector.

There is further provided, according to some embodiments of the invention, a method of applying RF energy to an object in an energy application zone via one or more radiating elements at a plurality of modulation space elements (MSEs). The method may include: causing supply of RF energy to one or more of the radiating elements in a first subset of the plurality of MSEs, at a first power level common to the MSEs in the first subset and for varying time durations; and causing supply of RF energy to one or more of the radiating elements in a second subset of the plurality of MSEs, at power levels lower than the first power level and for a time duration common to the MSEs of the second plurality.

In some embodiments, each of the varying time durations is not shorter than the time duration common to the MSEs of the second subset of MSEs.

In some embodiments, the method may further include grouping the MSEs into the first and second sets of MSEs based on absorbability indicators associated with the MSEs.

In some embodiments, the method may further include: associating MSEs with absorbability indicators, and grouping the MSEs into the first subset and second subset based on the absorbability indicators associated with the MSEs.

In some embodiments, the method may further include: receiving from a detector readings of power exiting from the energy application zone, and determining an absorbability indicator for each MSE based on received readings of power exiting from the energy application zone.

There is also provided, according to some embodiments of the invention, an apparatus for applying RF energy to an object in an energy application zone via one or more radiating elements at a plurality of modulation space elements (MSEs), which comprises at least one processor configured to: cause supply of RF energy to one or more of the radiating elements in a first subset of the plurality of MSEs, at a first power level common to the plurality of MSEs in the first subset and for a first time duration common to the MSEs of the first subset, and cause supply of RF energy to one or more of the radiating elements in a second subset of the plurality of MSEs, at a second power level common to the plurality of MSEs in the second subset and for a second time duration common to the MSEs of the second subset.

In some embodiments, the first power level is higher than the second power level and the first time duration is shorter than the second time duration.

In some embodiments, each MSE is associated with an absorbability indicator, and the absorbability indicators associated with the MSEs of the first subset of MSEs are different from the absorbability indicators associated with MSEs of the second subset of MSEs.

In some embodiments, absorbability indicators associated with MSEs of the first subset are lower than absorbability indicators associated with MSEs of the second subset.

In some embodiments, the at least one processor is configured to associate MSEs with absorbability indicators, and group the MSEs into the first subset and second subset based on the absorbability indicators associated with the MSEs.

IN some embodiments, the apparatus may further comprise a detector configured to detect power exiting from the energy application zone, and determine an absorbability indicator for each MSE based on readings of the detector.

The preceding summary is not intended to restrict in any way the scope of the claimed invention. In addition, it is to be understood that the foregoing detailed description are exemplary and explanatory only and are not restrictive of the invention, as claimed.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

In one respect, the invention may involve apparatuses and methods for applying electromagnetic energy. The term electromagnetic energy, as used herein, includes energy deliverable by electromagnetic radiation in all or portions of the electromagnetic spectrum, including but not limited to, radio frequency (RF), infrared (IR), near infrared, visible light, ultraviolet, etc. In one particular example, applied electromagnetic energy may include RF energy with a wavelength in free space of 100 km to 1 mm, which corresponds to a frequency of 3 KHz to 300 GHz, respectively. In some other examples, the applied electromagnetic energy may fall within frequency bands between 500 MHz to 1500 MHz or between 700 MHz to 1200 MHz or between 800 MHz-1 GHz. Applying energy in the RF portion of the electromagnetic spectrum is referred herein as applying RF energy. Microwave and ultra high frequency (UHF), for example, are both within the RF range. In some other examples, the applied electromagnetic energy may fall only within one or more ISM frequency bands, for example, between 433.05 and 434.79 MHz, between 902 and 928 MHz, between 2400 and 2500 MHz, and/or between 5725 and 5875 MHz.

Figure 1:
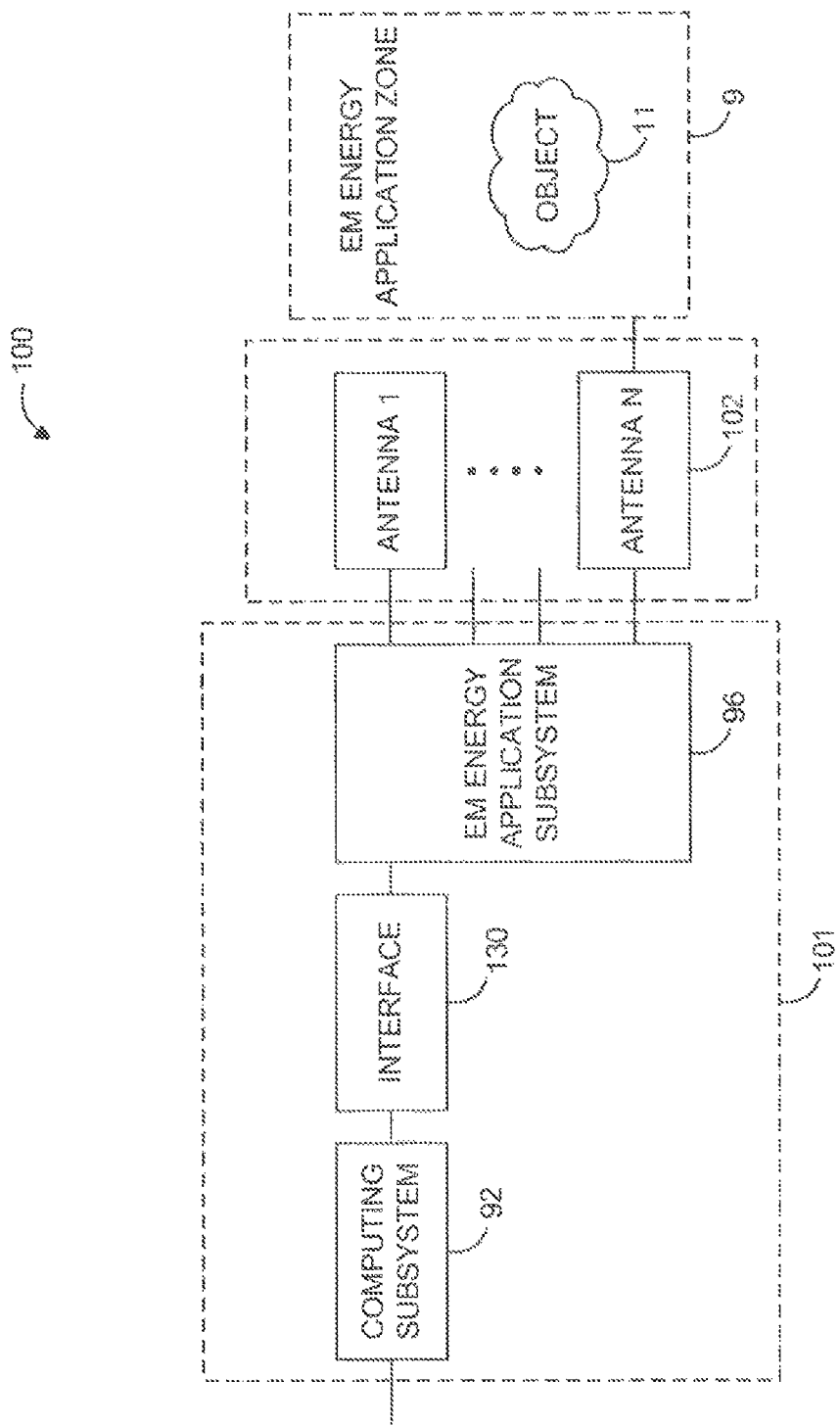
FIG. 1 is a diagrammatic representation of an apparatus for applying electromagnetic energy to an object, in accordance with some exemplary embodiments of the present invention.

In certain embodiments, the application of electromagnetic energy may occur in an "energy application zone", such as energy application zone 9, as shown in FIG. 1, which diagrammatically depicts an apparatus 100 according to some embodiments. Energy application zone 9 may include any void, location, region, or area where electromagnetic energy may be applied. It may be hollow, or may be filled or partially filled with liquids, solids, gases, or combinations thereof. By way of example only, energy application zone 9 may include an interior of an enclosure, interior of a partial enclosure, open space, solid, or partial solid, that allows existence, propagation, and/or resonance of electromagnetic waves. Zone 9 may include a conveyor belt or a rotating plate. Some energy application zones may alternatively be referred to as cavities. It is to be understood that an object is considered "in" the energy application zone if at least a portion of the object is located in the zone.

Cavity (for example—cavity 10 illustrated in FIG. 2) may be cylindrical in shape (or any other suitable shape, such as semi-cylindrical, rectangular, spherical shape or hemispherical shape, elliptical, cuboid, symmetrical, asymmetrical, irregular, regular, among others) and may be made of a conductor, such as aluminum, stainless steel or any suitable metal or other conductive material. In some embodiments, cavity 10 may include walls coated and/or covered with a protective coating, for example, made from materials transparent to EM energy, e.g., metallic oxides or others. It is also contemplated that cavity 10 may be closed, e.g., completely enclosed (e.g., by conductor materials), bounded at least partially, or open, e.g., having non-bounded openings. A cavity may include any structure that supports the development of standing and/or propagating waves at the frequencies supplied from the source to the radiating elements. The general methodology of the invention is not limited to any particular cavity shape or configuration.

Application of electromagnetic energy may result in excitation of an electromagnetic field of particular pattern in the energy application zone. The field pattern may be determined, or at least influenced by one or more parameters.

The term "modulation space" or "MS" is used to collectively refer to controllable parameters that may affect a field pattern in the energy application zone and combinations thereof. In some embodiments, the "MS" may include components that may be used and their potential settings (absolute and/or relative to others) and adjustable parameters associated with the components. For example, the "MS" may include a plurality of variable parameters, the number of antennas, their positioning and/or orientation (if modifiable), the useable bandwidth, a set of useable frequencies and any combinations thereof, power settings, phases, etc. The MS may have any number of possible variable parameters, ranging from one parameter only (e.g., a one dimensional MS limited to frequency only or phase only—or other single parameter), two or more dimensions (e.g., varying frequency and amplitude or varying frequency and phase together within the same MS), or many more.

Each variable parameter associated with the MS is referred to as an MS dimension. By way of example, a three dimensional modulation space has three dimensions, for example frequency (F), phase (P), and amplitude (A). In such a three dimensional MS, frequency, phase, and amplitude (e.g., an amplitude difference between two or more waves being transmitted at the same time) of the electromagnetic waves may be controlled and/or modulated during energy application, while all the other parameters may be fixed during energy application. The MS may have any number of dimensions, e.g., one dimension, two dimensions, four dimensions, n dimensions, etc. In one example, a one dimensional modulation space oven may provide MSEs that differ one from the other only by frequency.

The term "modulation space element" or "MSE," may refer to a specific set of values of the variable parameters in MS. Therefore, the MS may also be considered to be a collection of possible MSEs. For example, two MSEs may differ one from another in the relative amplitudes of the energy being supplied to a plurality of radiating elements. For example, a three-dimensional MSE may include a specific frequency F(i), a specific phase P(i), and a specific amplitude A(i). If even one of these MSE variables changes, then the new set defines another MSE. For example, (3 GHz, 30°, 12 V) and (3 GHz, 60°, 12 V) are two different MSEs, although they differ only in the phase component.

Differing combinations of these MS parameters may lead to differing field patterns across the energy application zone and differing energy distribution patterns in the object. A plurality of MSEs that can be executed sequentially or simultaneously to excite a particular field pattern in the energy application zone may be collectively referred to as an "energy application scheme." For example, an energy application scheme may consist of three MSEs: (F(1), P(1), A(1)); (F(2), P(2), A(2)); (F(3), P(3), A(3)). Such an energy application scheme may result in applying energy at the first, second, and third MSE to the energy application zone.

Any number of MSEs or MSE combinations may be used. For example, various MSE combinations may be used depending on the requirements of a particular application and/or on a desired energy transfer profile, and/or aspects of particular equipment, e.g., cavity dimensions. The number of options that may be employed could be as few as two or as many as the designer desires, depending on factors such as intended use, level of desired control, hardware or software resolution and cost.

In accordance with some embodiments of the invention, an apparatus or method may involve the use of at least one source configured to deliver electromagnetic energy to the energy application zone. A "source" may include any component(s) that are suitable for generating and delivering electromagnetic energy.

Consistent with some embodiments of the invention, electromagnetic energy may be delivered to the energy application zone in the form of propagating electromagnetic waves at predetermined wavelengths or frequencies (also known as electromagnetic radiation). As used herein, "propagating electromagnetic waves" may include resonating waves, propagating waves, evanescent waves, and waves that travel through a medium in any other manner. Electromagnetic radiation carries energy that may be imparted to (or dissipated into) matter with which it interacts.

As used herein, if a machine (e.g., a processor) is described as "configured to" perform a task (e.g., configured to cause application of a predetermined field pattern), then, at least in some embodiments, the machine may include components, parts, or aspects (e.g., software) that enable the machine to perform a particular task. In some embodiments, the machine may perform this task during operation. Similarly, when a task is described as being done "in order to" establish a target result (e.g., in order to apply a plurality of electromagnetic field patterns to the object), then, at least in some embodiments, carrying out the task may accomplish the target result.

In certain embodiments, electromagnetic energy may be applied to an object 11. References to an "object" (or "object to be heated") to which electromagnetic energy is applied is not limited to a particular form. An object may include a liquid, semi-liquid, solid, semi-solid, or gas, depending upon the particular process with which the invention is utilized. The object may also include composites or mixtures of matter in differing phases. Thus, by way of non-limiting example, the term "object" may encompass such matter as food to be defrosted or cooked; clothes or other wet material to be dried; frozen organs to be thawed; frozen material to be thawed; chemicals to be reacted; fuel or other combustible material to be combusted; hydrated material to be dehydrated, gases to be expanded; liquids to be heated, boiled or vaporized, or any other material for which there is a desire to apply, even nominally, electromagnetic energy.

In some embodiments, the object may include a frozen-food-like item. A frozen-food-item may have a dielectric constant ($\in$) having a real part ($\in'$) smaller than about 10 and an imaginary part ($\in''$) smaller than about 1. For comparison, water at 20° C. has $\in'$ of about 79, and $\in''$ of about 4. One group of frozen-food-like items may include frozen food, e.g., frozen beef, fish, and potatoes, whether raw, cooked, or mashed.

Consistent with the presently disclosed embodiments, energy may be supplied to one or more transmitting antennas (also referred to as "transmitting radiating element" or "transmitter"). Energy supplied to a transmitting antenna may result in energy emitted by the transmitting antenna (referred to herein as "incident energy"). The incident energy may be delivered to zone 9, and may be in an amount equal to an amount of energy supplied to the transmitting antenna(s) by a source. A portion of the incident energy may be dissipated in the object or absorbed by the object (referred to herein as "dissipated energy" or "absorbed energy"). Another portion may be reflected back to the transmitting antenna (referred to herein as "reflected energy"). Reflected energy may include, for example, energy reflected back to the transmitting antenna due to mismatch caused by the object and/or the energy application zone, e.g., impedance mismatch. Reflected energy may also include energy retained by the port of the transmitting antenna (e.g., energy that is emitted by the antenna but does not flow into the zone). The rest of the incident energy, other than the reflected energy and dissipated energy, may be coupled to one or more receiving antennas other than the transmitting antenna (referred to herein as "coupled energy."). Therefore, the incident energy ("I") supplied to the transmitting antenna may include all of the dissipated energy ("D"), reflected energy ("R"), and coupled energy ("C"), and may be expressed according to the relationship: I=D+R+C.

In accordance with certain aspects of the invention, the one or more transmitting antennas may deliver electromagnetic energy into zone 9. Energy delivered by a transmitting antenna into the zone (referred to herein as "delivered energy" or (d)) may be the incident energy emitted by the antenna minus the reflected energy at the same antenna. That is, the delivered energy may be the net energy that flows from the transmitting antenna to the zone, i.e., d=I−R. Alternatively, the delivered energy may also be represented as the sum of dissipated energy and coupled energy, i.e., d=D+C (where C=ΣCi).

In certain embodiments, the application of electromagnetic energy may occur via one or more radiating elements (e.g., antennas 102) for applying electromagnetic energy to the zone. Such radiating elements may include, for example, patch antennas, fractal antennas, helix antennas, log-periodic antennas, spiral antennas, slot antennas, dipole antennas, loop antennas, slow wave antennas, leaky wave antennas or any other structures capable of transmitting and/or receiving electromagnetic energy.

The invention is not limited to radiating elements having particular structures or locations. Antennas, e.g., antenna 102, may be polarized in differing directions in order to, for example, reduce coupling, enhance specific field pattern(s), increase the energy delivery efficiency and support and/or enable a specific algorithm(s). The foregoing are examples only, and polarization may be used for other purposes as well. In one example, three antennas may be placed parallel to orthogonal coordinates, however, it is contemplated that any suitable number of antennas (such as one, two, three, four, five, six, seven, eight, etc.) may be used. For example, a higher number of antennas may add flexibility in system design and improve control of energy distribution, e.g., greater uniformity and/or resolution of energy application in zone 9.

In certain embodiments, there may be provided at least one processor. As used herein, the term "processor" may include an electric circuit that performs a logic operation on input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations. The at least one processor may be coincident with or may be part of controller 101.

The instructions executed by the processor may, for example, be pre-loaded into the processor or may be stored in a separate memory unit such as a RAM, a ROM, a hard disk, an optical disk, a magnetic medium, a flash memory, other permanent, fixed, or volatile memory, or any other mechanism capable of storing instructions for the processor. The processor(s) may be customized for a particular use, or can be configured for general-purpose use and can perform different functions by executing different software.

If more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically or by other means permitting them to interact.

The at least one processor may be configured to cause electromagnetic energy to be applied to zone 9 via one or more antennas, for example across a series of MSEs, in order to apply electromagnetic energy at each such MSE to an object 11. For example, the at least one processor may be configured to regulate one or more components of controller 101 in order to cause the energy to be applied.

In certain embodiments, the at least one processor may be configured to determine a value indicative of energy absorbable by the object at each of a plurality of MSEs. This may occur, for example, using one or more lookup tables, by pre-programming the processor or memory associated with the processor, and/or by testing an object in an energy application zone to determine its absorbable energy characteristics. One exemplary way to conduct such a test is through a sweep.

As used herein, a sweep may include, for example, the transmission over time of energy at more than one MSE. For example, a sweep may include the sequential transmission of energy at multiple MSEs in one or more contiguous MSE bands; the sequential transmission of energy at multiple MSEs in more than one non-contiguous MSE band; the sequential transmission of energy at individual non-contiguous MSEs; and/or the transmission of synthesized pulses having a desired MSE/power spectral content (e.g., a synthesized pulse in time). The MSE bands may be contiguous or non-contiguous. Thus, during an MSE sweeping process, the at least one processor may regulate the energy supplied to the at least one antenna to sequentially apply electromagnetic energy at various MSEs to zone 9, and to receive electromagnetic feedback which serves as an indicator of the energy absorbable by object 11. While the invention is not limited to any particular measure of feedback indicative of energy absorbable in the object, various exemplary indicative values are discussed below.

During the sweeping process, electromagnetic energy application subsystem 96 may be regulated to receive electromagnetic energy reflected and/or coupled at radiating elements(s) (e.g., antenna(s) 102), and to communicate the measured energy information (e.g., information pertaining to and/or related to and/or associated with the measured energy) back to computing subsystem 92 via interface 130, as illustrated in FIG. 1. Computing subsystem 92 may then be regulated to determine (e.g., by calculating) a value indicative of energy absorbable by object 11 at each of a plurality of MSEs based on the received information. Consistent with some of the presently disclosed embodiments, a value indicative of the absorbable energy (also referred to herein as absorbability indicator, or, AI) may include a dissipation ratio (referred to herein as "DR") associated with each of a plurality of MSEs.

As referred to herein, a "dissipation ratio" (or "absorption efficiency" or "power efficiency"), may be defined as a ratio between electromagnetic energy absorbed by object 11 and electromagnetic energy supplied to the transmitting radiating element. In some embodiments, a dissipation ratio may be defined as a ratio between electromagnetic energy absorbed by object 11 and electromagnetic energy delivered to zone 9. The delivered energy may be defined as the difference between the energy supplied to a radiating element and the energy reflected back to the radiating element.

Energy that may be dissipated or absorbed by an object is referred to herein as "absorbable energy" or "absorbed energy". Absorbable energy may be an indicator of the object's capacity to absorb energy or the ability of the apparatus to cause energy to dissipate in a given object (for example—an indication of the upper limit thereof). In some of the presently disclosed embodiments, absorbable energy may be calculated as a product of the incident energy (e.g., maximum incident energy) supplied to the at least one antenna and the dissipation ratio. Reflected energy (e.g., the energy not absorbed or transmitted) may, for example, be a value indicative of energy absorbed by the object. By way of another example, a processor may calculate or estimate absorbable energy based on the portion of the incident energy that is reflected and the portion that is coupled to other antennas. That estimate or calculation may serve as a value indicative of absorbed and/or absorbable energy.

An absorbability indicator (AI) may be the ratio between power supplied to (or entered into) the energy application zone, and energy detected as exiting from the energy application zone. Thus, in some embodiments, AI may be defined as $AI=P_{in}/P_{out}$. $P_{in}$ may be the power supplied to one or more of the radiating elements, and Pout may be the power detected by the available detectors as exiting the energy application zone. In some embodiments, $P_{in}$ may be the power supplied to the energy application zone. Alternatively, $P_{in}$ may be estimated as a difference between the power supplied by an emitting radiating element and the power reflected back to the emitting radiating element.

During an MSE sweep, for example, the at least one processor may be configured to control a source of electromagnetic energy such that energy is sequentially supplied to an object at a series of MSEs. The at least one processor might then receive a signal indicative of energy reflected at each MSE and, optionally, also a signal indicative of the energy coupled to other antennas at each MSE. Using a known amount of incident energy supplied to the antenna and a known amount of energy reflected and/or coupled (e.g., thereby indicating an amount of energy absorbed at each MSE), an absorbable energy indicator may be calculated or estimated. Alternatively, the processor might simply rely on an indicator of reflection and/or coupling as a value indicative of absorbable energy.

Absorbable energy may also include energy that may be dissipated by the structures of the energy application zone in which the object is located (e.g., cavity walls) or leakage of energy at an interface between an oven cavity and an oven door. Because absorption in metallic or conducting material (e.g., the cavity walls or elements within the cavity) may be characterized by a large quality factor (also known as a "Q factor"), MSEs having a large Q factor may be identified as being associated with conducting material, and at times, a choice may be made not to transmit energy in such MSEs (or to reduce energy transmitted at those MSEs). In some cases, the amount of electromagnetic energy absorbed in the cavity walls may be substantially small, and thus, the amount of electromagnetic energy absorbed in the object may be substantially equal to the amount of absorbable energy.

In some of the presently disclosed embodiments, a dissipation ratio may be calculated using formula (1):

$$DR = P_{abs}/P_{in} \quad (1)$$

where $P_{abs}$ is the power adsorbed in the object, and $P_{in}$ is the incident power.

The dissipated power may be equated with the difference between the incident power and the power detected by sensors in or around the cavity. If these sensors also constitute the radiating elements, equation (1) may be equivalent to equation (1a).

$$DR = (P_{in} - P_{rf} - P_{cp})/P_{in} \quad (1a)$$

where $P_{in}$ represents the electromagnetic energy and/or power supplied to antennas 102, $P_{rf}$ represents the electromagnetic energy and/or power reflected/returned at those antennas that function as transmitters, and $P_{cp}$ represents the electromagnetic energy and/or power coupled at those antennas that function as receivers. The nominator, $(P_{in} - P_{rf} - P_{cp})$ may be referred to as "non-detected power", since this power is not detected to leave the energy application zone, but is known to enter. Alternatively or additionally, the nominator may be referred to as "absorbed power", since it may provide a good estimation to the adsorbed power; an estimation that may be accurate if no power is lost by any mechanism (e.g., cavity walls) other than being absorbed by the object. The terms "non-detected power (or energy)" and "absorbed power (or energy)" may be similarly used to refer to the difference between incident energy on the one hand, and the sum of reflected and coupled energies on the other hand. DR may be a unit-less value between 0 and 1, and thus may be represented by a percentage number.

Alternatively or additionally, another kind of dissipation ratio may be calculated using formula (2a):

$$\Delta\rho = P_{abs}/(P_{in} - P_{rf}) \quad (2a)$$

Replacing $P_{abs}$ with $(P_{in} - P_{rf} - P_{cp})$, as done above may result in equation (2b) for $\Delta\rho$:

$$\Delta\rho = (P_{in} - P_{rf} - P_{cp})/(P_{in} - P_{rf}) \quad (2b)$$

This dissipation ratio may measure the amount of dissipated power (or non-detected power) as a portion of the delivered power, that is, the power that was emitted and did not return to the emitting radiating element. It is noted that the incident, reflected, and coupled powers may also be indicative of the respective energies. This dissipation ratio may be useful to identify frequencies at which the object absorbs a significant amount of the energy delivered to the energy application zone, even if only a small portion of the supplied energy is delivered to the zone, and a large portion is reflected back to or retained at the emitting radiating element, for example, due to poor matching. The use of $\Delta\rho$ may be limited to apparatuses that provide energy via two or more radiating elements, because if only one radiating element exists, no energy is coupled from one radiating element to another, and $\Delta\rho$ is equal to 1 by definition.

For example, consistent with an embodiment which is designed for three antennas 1, 2, and 3, computing subsystem 92 may be configured to determine input reflection coefficients $S_{11}$, $S_{22}$, and $S_{33}$, and the transfer coefficients (which may also be referred to as transmission coefficients) may be $S_{12}=S_{21}$, $S_{13}=S_{31}$, $S_{23}=S_{32}$ based on a measured power and/or energy information during the sweep. Accordingly, the dissipation ratio DR corresponding to antenna 1 may be determined based on the above mentioned reflection and transmission coefficients, according to formula (3):

$$DR^1 = 1 - (|S_{11}|^2 + |S_{12}|^2 + |S_{13}|^2). \quad (3)$$

Similarly, the dissipation ratio $\Delta\rho$ corresponding to antenna 1 may be determined based on the above mentioned reflection and transmission coefficients, according to formula (3a):

$$\Delta\rho^1 = [1 - (|S_{11}|^2 + |S_{12}|^2 + |S_{13}|^2)]/(1 - |S_{11}|^2) = DR^1/(1 - |S_{11}|^2) \quad (3a)$$

In some embodiments, a common DR may be defined for the two radiating elements:

$$DR^{1+2} = P_{abs}/(P_{in}^1 + P_{in}^2)$$

$$DR^{1+2} = [(P_{in}^1 + P_{in}^2) - (P_{out}^1 + P_{out}^2)]/(P_{in}^1 + P_{in}^2)$$

wherein the $P_{in}^1$ and $P_{in}^2$ are the power (or energy) incident at radiating element 1 and 2, respectively.

The value indicative of the absorbable energy may further involve the maximum incident energy associated with a power amplifier (not illustrated) of subsystem 96 at the given MSE. As referred herein, a "maximum incident energy" may be defined as the maximal power that may be provided to the antenna at a given MSE throughout a given period of time. Thus, one alternative value indicative of absorbable energy may be the multiplicative product of the maximum incident energy and the dissipation ratio. These are just two examples of values that may be indicative of absorbable energy which could be used alone or together as part of control schemes implemented in controller 101. Alternative indicators of absorbable energy may be used, depending for example on the structure employed and the application.

In certain embodiments, the at least one processor may also be configured to cause energy to be supplied to the at least one radiating element in at least a subset of a plurality of MSEs. Energy transmitted to the zone at each of the subset of MSEs may be a function of the absorbable energy value at the corresponding MSE. For example, energy transmitted to the zone at MSE(i) may be a function of the absorbable energy value at MSE(i). The energy supplied to at least one radiating element at each of the subset of MSEs may be determined as a function of the absorbable energy value at each MSE (e.g., as a function of a dissipation ratio, maximum incident energy, a combination of the dissipation ratio and the maximum incident energy, or some other indicator). In some embodiments, the subset of the plurality of MSEs and/or the energy transmitted to the zone at each of the subset of MSEs may be determined based on or in accordance with a result of absorbable energy information (e.g., absorbable energy feedback) obtained during an MSE sweep (e.g., at the plurality of MSEs). That is, using the absorbable energy information, the at least one processor may adjust energy supplied at each MSE such that the amount of energy supplied at a particular MSE may correlate with an indicator of absorbable energy at that MSE. The correlation may vary depending upon application and/or a desired target effect, e.g., if a uniform energy distribution profile may be desired across object 11. For example, if energy efficiency is more important than uniformity, the correlation may involve associating larger amounts of energy with MSEs where energy is absorbed more readily. If, on the other hand, uniformity is more important than energy efficiency, larger amounts of energy may be associated with other MSEs, including some that exhibit lower energy absorption characteristics that others. The invention is not limited to any particular scheme, but rather may encompass any technique for controlling the energy supplied by taking into account an indication of absorbable energy.

In certain embodiments, the at least one processor may be configured to cause energy to be supplied to the at least one radiating element in at least a subset of the plurality of MSEs, where energy transmitted to the zone at each of the subset of MSEs is inversely related to the absorbable energy value at the corresponding MSE. Such an inverse relationship may involve a general trend—e.g., when an indicator of absorbable energy in a particular MSE subset (i.e., one or more MSEs) tends to be relatively high, the actual incident energy at that MSE subset may be relatively low. When an indicator of absorbable energy in a particular MSE subset tends to be relatively low, the incident energy may be relatively high. This substantially inverse relationship may be even more closely correlated. For example, the transmitted energy may be set such that its product with the absorbable energy value (i.e., the absorbable energy by object 11) is substantially constant across the MSEs applied.

Some exemplary energy application schemes may lead to more spatially uniform energy absorption in the object. As used herein, "spatial uniformity" may refer to a condition where the absorbed energy across the object or a portion (e.g., a selected portion) of the object that is targeted for energy application is substantially constant (for example per volume unit or per mass unit). In some embodiments, the energy absorption is considered "substantially constant" if the variation of the dissipated energy at different locations of the object is lower than a threshold value. For instance, a deviation may be calculated based on the distribution of the dissipated energy in the object, and the absorbable energy is considered "substantially constant" if the deviation between the dissipation values of different parts of the object is less than 50%. Because in many cases spatially uniform energy absorption may result in a spatially uniform temperature increase, consistent with the presently disclosed embodiments, "spatial uniformity" may also refer to a condition where the temperature increase across the object or a portion of the object that is targeted for energy application is substantially constant. The temperature increase may be measured by a sensing device, for example a temperature sensor provided in zone 9. In some embodiments, spatial uniformity may be defined as a condition, where a given property of the object is uniform or substantially uniform after processing, e.g., after a heating process. Examples of such properties may include temperature, readiness degree (e.g., of food cooked in the oven), mean particle size (e.g., in a sintering process), etc.

In order to achieve control over the energy application, controller 101 may be configured to hold substantially constant the time duration at which energy is supplied to radiating elements at each MSE, while varying the amount of power supplied at each MSE as a function of the absorbable energy value. In some embodiments, controller 101 may be configured to cause the energy to be supplied to the radiating element at a particular MSE or MSEs at a power level substantially equal to a maximum power level of the device and/or the amplifier at the respective MSE(s).

Alternatively or additionally, controller 101 may be configured to vary the period of time during which energy is applied to each MSE as a function of the absorbable energy value. At times, both the duration and power at which each MSE is applied are varied as a function of the absorbable energy value. Varying the power and/or duration of energy supplied at each MSE may be used to cause substantially uniform energy absorption in the object or to have a controlled spatial pattern of energy absorption, for example, based on feedback from the dissipation properties of the object at each transmitted MSE.

Consistent with some embodiments, controller 101 may be configured to cause the amplifier or the source to supply no energy at all at particular MSE(s). Similarly, if the absorbable energy value exceeds a predetermined threshold, controller 101 may be configured to cause the antenna to supply energy at a power level less than a maximum power level of the source.

Because absorbable energy can change based on a host of factors including object temperature, in some embodiments, it may be beneficial to regularly update (e.g., measure) absorbable energy values and adjust energy application based on the updated absorbable values. These updates can occur multiple times a second, or can occur every few seconds or longer, depending on the requirements of a particular application.

In accordance with some embodiments of the invention, the at least one processor (e.g., controller 101 or processor 2030) may be configured to determine a desired and/or target energy absorption level at each of a plurality of MSEs and adjust energy supplied to the antenna at each MSE in order to obtain the target energy absorption level at each MSE. For example, controller 101 may be configured to target a desired energy absorption level at each MSE in order to achieve or approximate substantially uniform energy absorption across a range of MSEs.

Figure 2:
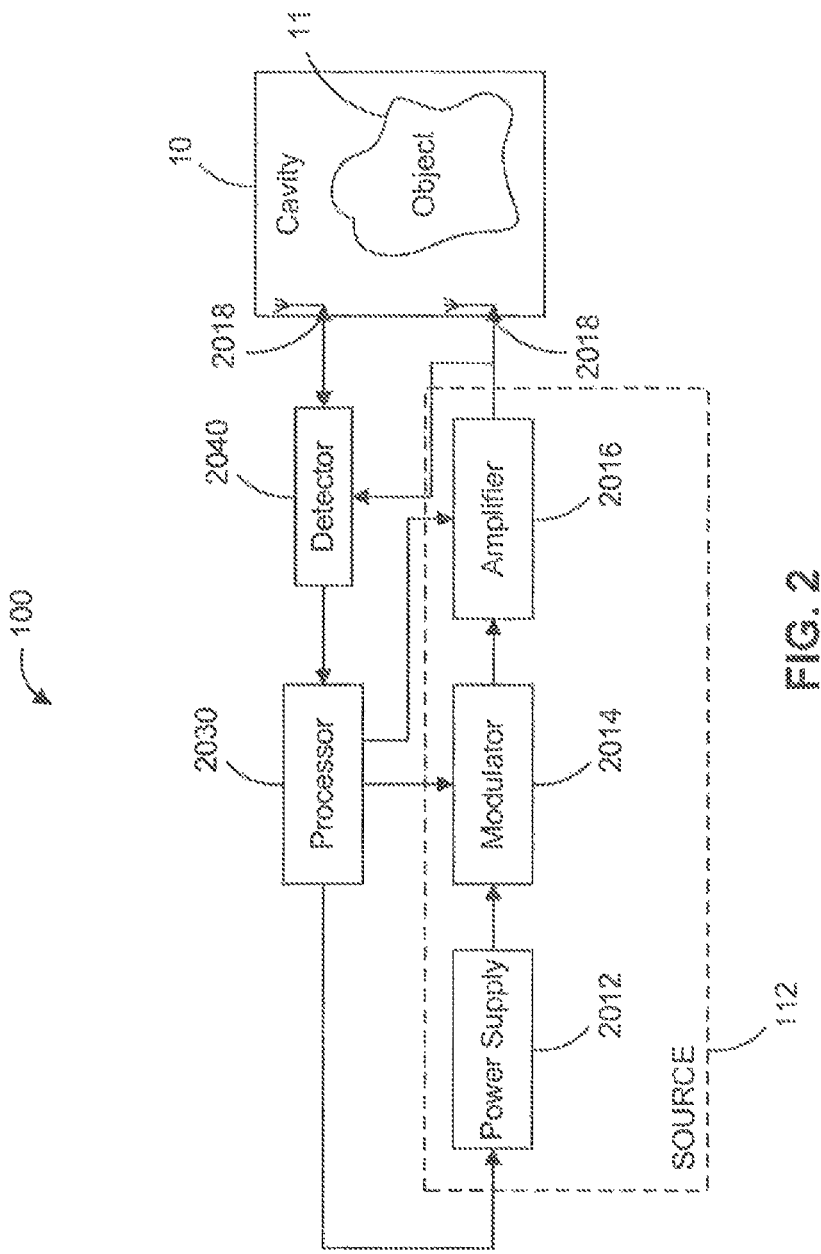
FIG. 2 is a diagrammatic representation of an apparatus for applying electromagnetic energy to an object, in accordance with some exemplary embodiments of the present invention.

Reference is now made to FIG. 2, which provides a diagrammatic representation of an exemplary apparatus 100 for applying electromagnetic energy to an object, in accordance with some embodiments of the present invention. In accordance with some embodiments, apparatus 100 may include a processor 2030 which may regulate modulations performed by modulator 2014. In some embodiments, modulator 2014 may include at least one of a phase modulator, a frequency modulator, and an amplitude modulator configured to modify the phase, frequency and amplitude of an AC waveform generated by power supply 2012. Processor 2030 may alternatively or additionally regulate at least one of location, orientation, and configuration of radiating element(s) 2018, for example, using an electromechanical device. Such an electromechanical device may include a motor or other movable structure for rotating, pivoting, shifting, sliding or otherwise changing the orientation and/or location of one or more of radiating elements 2018. Alternatively or additionally, processor 2030 may be configured to regulate one or more field adjusting elements located in the energy application zone, in order to change the field pattern in the zone.

In some embodiments, apparatus 100 may involve the use of at least one source configured to deliver electromagnetic energy to the energy application zone. By way of example, and as illustrated in FIG. 2, the source may include one or more of a power supply 2012 configured to generate electromagnetic waves that carry electromagnetic energy. For example, power supply 2012 may be a magnetron configured to generate high power microwave waves at a predetermined wavelength or frequency. Alternatively, power supply 2012 may include a semiconductor oscillator, such as a voltage controlled oscillator, configured to generate AC waveforms (e.g., AC voltage or current) with a constant or varying frequency. AC waveforms may include sinusoidal waves, square waves, pulsed waves, triangular waves, or another type of waveforms with alternating polarities. Alternatively, a source of electromagnetic energy may include any other power supply, such as electromagnetic field generator, electromagnetic flux generator, solid-state amplifier or any mechanism for generating vibrating electrons.

In some embodiments, apparatus 100 may include a phase modulator (which may be included, for example, in modulator 2014) that may be controlled to perform a predetermined sequence of time delays on an AC waveform, such that the phase of the AC waveform is increased by a number of degrees (e.g., 10 degrees) for each of a series of time periods. In some embodiments, processor 2030 may dynamically and/or adaptively regulate modulation based on feedback from the energy application zone. For example, processor 2030 may be configured to receive an analog or digital feedback signal from detector 2040. This signal may constitute electromagnetic feedback, indicating, for example, an amount of electromagnetic energy received from cavity 10. Processor 2030 may dynamically determine a time delay at the phase modulator for the next time period based on the received feedback signal. In some embodiments, processor 2030 may be configured to adjust the phase modulator (e.g., to control a phase difference between two transmitting radiating elements) based on the feedback signal from detector 2040 or any feedback derived (e.g., calculated) based on the feedback signal. (e.g., AI value, DR value(s) etc.)

In some embodiments, apparatus 100 may include a frequency modulator (not illustrated). The frequency modulator may include a semiconductor oscillator configured to generate an AC waveform oscillating at a predetermined frequency. The predetermined frequency may be associated with an input voltage, current, and/or other signal (e.g., analog or digital signals). For example, a voltage controlled oscillator may be configured to generate waveforms at frequencies proportional to the input voltage.

Processor 2030 may be configured to regulate an oscillator (not illustrated) to sequentially generate AC waveforms oscillating at various frequencies within one or more predetermined frequency bands. In some embodiments, a predetermined frequency band may include a working frequency band, and the processor may be configured to cause the transmission of energy at frequencies within a sub-portion of the working frequency band. A working frequency band may include a collection of frequencies selected because, in the aggregate, they achieve a desired goal, and there is diminished need to use other frequencies in the band if that sub-portion achieves the goal. Once a working frequency band (or subset or sub-portion thereof) is identified, the processor may sequentially apply power at each frequency in the working frequency band (or subset or sub-portion thereof). This sequential process may be referred to as "frequency sweeping." In some embodiments, based on the feedback signal provided by detector 2040 (or any value derived based on it, e.g., DR, AI etc.), processor 2030 may be configured to select one or more frequencies from a frequency band and regulate an oscillator to sequentially generate AC waveforms at these selected frequencies.

Alternatively or additionally, processor 2030 may be further configured to regulate amplifier 2016 to adjust amounts of energy supplied to radiating elements 2018, based on the feedback signal. Consistent with some embodiments, detector 2040 may detect an amount of energy reflected from the energy application zone and/or energy coupled at a particular frequency, and processor 2030 may be configured to cause the amount of energy supplied at that frequency to be lower when the reflected energy and/or coupled energy is lower than when the reflected energy and/or coupled energy is higher. Additionally or alternatively, processor 2030 may be configured to cause one or more radiating elements to deliver energy at a particular frequency over a short duration when the reflected energy is low at that frequency. In some embodiments, detector 2040 may be associated with a dual directional coupler to measure the reflected energy and/or coupled energy.

In some embodiments, the apparatus may include more than one source of EM energy. For example, more than one oscillator may be used for generating AC waveforms of differing frequencies. The separately generated AC waveforms may be amplified by one or more amplifiers. Accordingly, at any given time, radiating elements 2018 may be caused to simultaneously transmit electromagnetic waves at, for example, two differing frequencies to cavity 10.

Processor 2030 may be configured to regulate the phase modulator in order to alter a phase difference between two electromagnetic waves supplied to the energy application zone. In some embodiments, the source of electromagnetic energy may be configured to supply electromagnetic energy in a plurality of phases, and the processor may be configured to cause the transmission of energy at a subset of the plurality of phases. By way of example, the phase modulator may include a phase shifter. The phase shifter may be configured to cause a time delay in the AC waveform in a controllable manner within cavity 10, delaying the phase of an AC waveform anywhere from between 0-360 degrees.

In some embodiments, a splitter (not illustrated) may be provided in apparatus 100 to split an AC signal, for example generated by an oscillator, into two AC signals (e.g., split signals). Processor 2030 may be configured to regulate the phase shifter to sequentially cause various time delays such that the phase difference between two split signals may vary over time. This sequential process may be referred to as "phase sweeping." Similar to the frequency sweeping described above, phase sweeping may involve a working subset of phases selected to achieve a desired energy application goal. In some embodiments, phase difference between two signals may be obtained directly from the power source—for example: the output frequency and the phase emitted from each radiating element may be determined by the source (for example: by using Direct Digital Synthesizer).

The processor may be configured to regulate an amplitude modulator in order to alter an amplitude of at least one electromagnetic wave supplied to the radiating element(s). In some embodiments, the source of electromagnetic energy may be configured to supply electromagnetic energy in a plurality of amplitudes, and the processor may be configured to cause the transmission of energy at a subset of the plurality of amplitudes. In some embodiments, the apparatus may be configured to apply electromagnetic energy through a plurality of radiating elements, and the processor may be configured to supply energy with differing amplitudes simultaneously to at least two radiating elements.

Although FIG. 2 illustrates circuits including two radiating elements (e.g., radiating elements 2018), it should be noted that any number of radiating elements may be employed, and the circuit may select combinations of MSEs through selective use of radiating elements. By way of example only, in an apparatus having three radiating elements A, B, and C, amplitude modulation may be performed with radiating elements A and B, phase modulation may be performed with radiating elements B and C, and frequency modulation may be performed with radiating elements A and C. In some embodiments amplitude may be held constant and field changes may be caused by switching between radiating elements and/or subsets of radiating elements. Further, radiating elements may include a device that causes their location or orientation to change, thereby causing field pattern changes. The combinations are virtually limitless, and the invention is not limited to any particular combination, but rather reflects the notion that field patterns may be altered by altering one or more MSEs.

Some or all of the forgoing functions and control schemes, as well as additional functions and control schemes, may be carried out, by way of example, using structures such as the electromagnetic energy application subsystems schematically depicted in FIG. 1 or FIG. 2.

Figure 3:
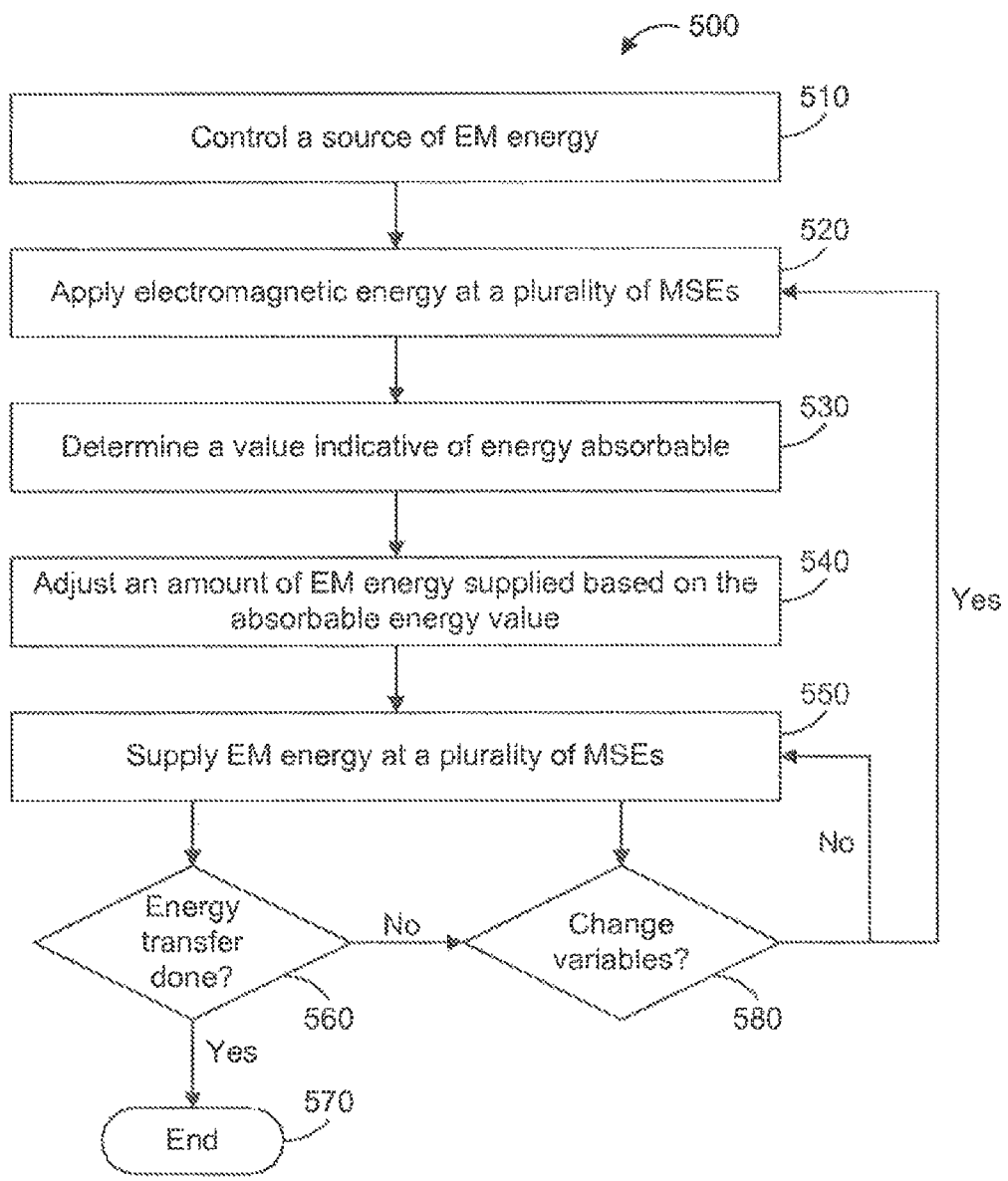
FIG. 3 is a flow chart of a method for applying electromagnetic energy to an energy application zone in accordance with some embodiments of the present invention.

FIG. 3 represents a method for applying electromagnetic energy to an object in accordance with some embodiments of the present invention. Electromagnetic energy may be applied to an object, for example, through at least one processor implementing a series of steps of method 500 of FIG. 3.

In certain embodiments, method 500 may involve controlling a source of electromagnetic energy (step 510). By way of example only, in step 510, the at least one processor may be configured to control electromagnetic energy application subsystem 96.

The source may be controlled to supply electromagnetic energy at a plurality of MSEs (e.g., at a plurality of frequencies, phases, amplitudes, or any other controllable parameter that may affect the field pattern excited in the energy application zone) to at least one radiating element, as indicated in step 520.

Various examples of MSE-based electromagnetic energy supply, including sweeping, may be implemented in step 520. Alternatively or additionally, other schemes for controlling the source may be implemented so long as that scheme results in the supply of energy at a plurality of MSEs (sequentially or simultaneously). The at least one processor may regulate subsystem 96 to supply energy at multiple MSEs to at least one transmitting radiating element (e.g., antenna 102).

In certain embodiments, the method may further involve a step 530 of determining (e.g., calculating) a value indicative of energy absorbable by the object at a plurality of MSEs, e.g., at each of the plurality of MSEs supplied in step 520. An absorbable energy value may include any indicator-whether calculated, measured, derived, estimated or predetermined— of an object's capacity to absorb energy. For example, computing subsystem 92 may be configured to determine an absorbable energy value, such as a dissipation ratio associated with each MSE; processor 2030 may determine DR values based on feedback signals received through detector 2040. The absorbable energy values may be determined during a scan cycle (to be further used in a heating cycle).

In certain embodiments, the method may also involve adjusting an amount of electromagnetic energy supplied at each of the plurality of MSEs based on the absorbable energy value at each MSE (step 540). For example, in step 540, the processor may determine an amount of energy to be applied at each MSE (e.g., during the heating cycle), as a function of the absorbable energy value associated with that MSE.

In some embodiments, a choice may be made not to use all possible MSEs. For example, a choice may be made not to use all possible frequencies in a working band, such that the emitted frequencies are limited to a sub band of frequencies, for example, where the Q factor in that sub band is smaller or higher than a threshold. Such a sub band may be, for example 50 MHz wide, 100 MHz wide, 150 MHz wide, or even 200 MHz wide or more.

In some embodiments, the at least one processor may determine a weight, e.g., power level, used for supplying the determined amount of energy at each MSE, as a function of the absorbable energy value. For example, an amplification ratio of amplifier 2016 may be changed inversely with the energy absorption characteristic of object 11 at each MSE. In some embodiments, when the amplification ratio is changed (e.g. inversely with the energy absorption characteristic), energy may be supplied for a constant amount of time at each MSE. Alternatively or additionally, the at least one processor may determine varying durations at which the energy is supplied at each MSE. For example, the duration and power may vary from one MSE to another, such that their product correlates (e.g., inversely) with the absorption characteristics of the object. In some embodiments, the controller may use the maximum available power at each MSE, which may vary between MSEs. This variation may be taken into account when determining the respective durations at which the energy is supplied at maximum power at each MSE. In some embodiments, the at least one processor and/or controller (e.g., controller 101) may determine both the power level and time duration for supplying the energy at each MSE.

In certain embodiments, the method may also involve supplying electromagnetic energy at a plurality of MSEs to the radiating elements (step 550) for example, at the amounts of energy determined in step 540. Respective weights may optionally be assigned to each of the MSEs to be transmitted (step 540) for example based on the absorbable energy value (as discussed above). Electromagnetic energy may be applied to cavity 10 via radiating elements, e.g., antenna 102 or 2018. The electromagnetic energy may be applied at multiple frequencies, phases, or, more generally, at multiple MSEs, within a single execution of step 550. Thus, an execution of step 550 may constitute a heating cycle.

Energy application may be interrupted periodically (e.g., several times a second) for a short time (e.g., only a few milliseconds or tens of milliseconds). Once energy application is interrupted, in step 560, it may be determined if the energy transfer should be terminated. Energy application termination criteria may vary depending on the requirements of a particular application. For example, for a heating application, termination criteria may be based on time, temperature, total energy absorbed, or any other indicator that the process at issue is complete. For example, heating may be terminated when the temperature of object 11 rises to a predetermined temperature threshold. In another example, e.g., in a thawing application, termination criteria may include any indication that the entire object is thawed.

If in step 560, it is determined that energy transfer should be terminated (step 560: yes), energy transfer may end in step 570. If the criterion or criteria for termination is not met (step 560: no), it may be determined if variables should be changed and reset in step 580. If not (step 580: no), the process may return to step 550 to continue transmission of electromagnetic energy. Otherwise (step 580: yes), the process may return to step 520 to determine new variables. For example, over time, the object properties may change; which may or may not be related to the electromagnetic energy transmission. Such changes may include temperature change, translation of the object (e.g., if placed on a moving conveyor belt or on a rotating plate), change in shape (e.g., mixing, melting or deformation for any reason) or volume change (e.g., shrinkage or puffing) or water content change (e.g., drying), flow rate, change in phase of matter, chemical modification, etc. Therefore, at times, it may be desirable to change the variables of transmission. The new variables that may be determined may include: a new set of MSEs (e.g., frequencies), an amount of electromagnetic energy incident or delivered at each of the plurality of MSEs, weight, e.g., power level, of the MSE(s) and duration at which the energy is supplied at each MSE.

In some embodiments, steps 510-550 may be repeated plurality of times while processing the object—for example: until a stop signal is received, e.g., from a user interface.

In some embodiments, controller 101 and/or processor 2030 may be configured to determine an amount of energy to be supplied to one or more of the radiating elements at each of the plurality of MSEs.

In some embodiments, controller 101 and/or processor 2030 may be configured to cause supply of electromagnetic energy to one or more of the radiating elements (e.g. radiating element 102 or 2018), for example, by sending a control signal to electromagnetic energy source 112, for example, to one or more of RF power supply 2012, amplifier 2016, and/or modulator 2014.

Controller 101 and/or processor 2030 may be configured to cause EM energy supply in at least a subset of the MSEs, for which amounts of energy are determined. In some embodiments, energy application in some of the MSEs may be omitted. Energy may be supplied based on the determined amount of energy and based on at least one power supply protocol. The amount of energy caused to be supplied may be equal to the determined amount of energy, and the power-time relationships used for supplying the determined amount of energy may be determined according to the power supply protocol.

According to some embodiments of the invention there is provided an apparatus for applying RF energy to an object in an energy application zone via one or more radiating elements at a plurality of modulation space elements (MSEs). The apparatus may comprise at least one processor configured to determine an amount of energy to be supplied to one or more of the radiating elements at each of the plurality of MSEs; select, for each MSE, a power supply protocol from a plurality of power supply protocols; and cause supply of electromagnetic energy to one or more of the radiating elements in at least a subset of the plurality of MSEs, based on the determined amounts of energy and based on the selected power supply protocols.

In some embodiments, each power supply protocol may include a rule that relates to or determines one or more of power level or energy application duration at which the determined amounts of energy are applied.

In some embodiments, the at least one processor may be configured to select a power supply protocol based on values of electromagnetic feedback received from the energy application zone. The electromagnetic feedback or a portion thereof may be received via one or more of the radiating elements. In some embodiments, the electromagnetic feedback includes a value indicative of energy absorbable by the object or data for obtaining said value.

In some embodiments, the at least one processor may be further configured to determine a value indicative of energy absorbable by the object at each of the plurality of MSEs, and determine the amount of energy based on that value.

In some embodiments, at least one protocol of the plurality of power supply protocols may include a time delay before and/or after power supply. Alternatively or additionally, at least one protocol of the plurality of power supply protocols may include supply of the electromagnetic energy to one or more of the radiating elements using a duty cycle of less than 100%.

In some embodiments, each power supply protocol may include a rule that delimits or determines one or more of power level or energy application duration at which the determined amounts of energy are applied.

Some embodiments of the invention may include a method of applying electromagnetic energy to an object in an energy application zone via one or more radiating elements at a plurality of modulation space elements (MSEs). The method may comprise: determining an amount of energy to be supplied to one or more of the radiating elements at each of the plurality of MSEs; selecting, for each MSE, a power supply protocol from a plurality of power supply protocols; and applying electromagnetic energy to one or more of the radiating elements in at least a subset of the plurality of MSEs, based on the determined amounts of energy and based on the selected power supply protocols.

In some embodiments, each power supply protocol may include a rule that relates to or determines one or more of power level or energy application duration at which the determined amounts of energy are applied.

In some embodiments, selecting a power supply protocol may be based on values of electromagnetic feedback received from the energy application zone. The electromagnetic feedback, wholly or partially, may be received via one or more of the radiating elements. Additionally or alternatively, the electromagnetic feedback may include a value indicative of energy absorbable by the object or data for obtaining said value.

In some embodiments, the method may include determining a value indicative of energy absorbable by the object at each of the plurality of MSEs, and determining the amount of energy based on that value.

In some embodiments, at least one protocol of the plurality of power supply protocols includes a time delay before and/or after power supply. Additionally or alternatively, at least one protocol of the plurality of power supply protocols may include supply of the electromagnetic energy to one or more of the radiating elements using a duty cycle of less than 100%.

A method according to some embodiments of the invention may further include determining a value indicative of energy absorbable by the object at each of the plurality of MSEs, and determining the amount of energy based on that value.

According to some embodiments of the invention there is provided an apparatus for applying RF energy to an object in an energy application zone via one or more radiating elements at a plurality of modulation space elements (MSEs). The apparatus may comprise at least one processor configured to: cause sequential supply of RF energy to one or more of the radiating elements at the plurality of MSEs and intermissions in the supply of RF energy between two MSEs. The intermissions and the energy applications may be for similar time durations.

According to some embodiments, each MSE is associated with a power level and time duration and the energy is applied according to an MSE sequence, at each MSE at the power level and for the time duration associated therewith. Some MSEs may be associated with zero power level, and the supply of RF energy may be intermitted for the time period associated with these MSEs.

For example, energy may be applied at a plurality of frequencies over a bandwidth (800 MHz-806 MHz) at a resolution of 1 MHz, according to the sequence shown in table 1 below, and whenever the power level is zero (in the table, this occurs only in the second MSE in the sequence) energy is intermitted for the time period associated with the same MSE (in the table, for $t_1$). In some embodiments, the various time values (e.g., $t_0$, $t_1$, etc.) may be the same. In some embodiments they may differ from one another, by a factor of 10 or less, 50 or less, or 100 or less, or an intermediate factor.

TABLE 1

| Number in sequence | Frequency [MHz] | Power level [arbitrary units] | Time duration [arbitrary units] |
|---|---|---|---|
| 1 | 800 | $P_0 \neq 0$ | $t_0$ |
| 2 | 801 | $P_1 \neq 0$ | $t_1$ |
| 3 | 802 | $P_2 \neq 0$ | $t_2$ |
| 4 | 803 | $P_3 \neq 0$ | $t_3$ |
| 5 | 804 | $P_4 \neq 0$ | $t_4$ |
| 6 | 805 | $P_5 \neq 0$ | $t_5$ |
| 7 | 806 | $P_6 \neq 0$ | $t_6$ |

All MSEs associated with a zero power level may be associated with common time duration, such that all intermissions are of the same length. However, some intermissions may coalesce, for example, if two or more consecutive MSEs are associated with zero power level.

MSEs associated with zero power level may be referred to as zero-power MSEs, and MSEs associated with non-zero power levels may be referred to as non-zero-power MSEs. In some embodiments, each MSE may be associated with an absorbability indicator, and the absorbability indicators associated with zero-power MSEs are different from the absorbability indicators associated with non-zero-power MSEs, for example, the zero-power MSEs may be associated with lower AI values than the non-zero-power MSEs.

In some embodiments, the absorbability indicators associated with zero-power MSEs are lower than a predefined threshold. The processor may receive the predefined threshold from an interface, for example: a user interface.

Figure 4:
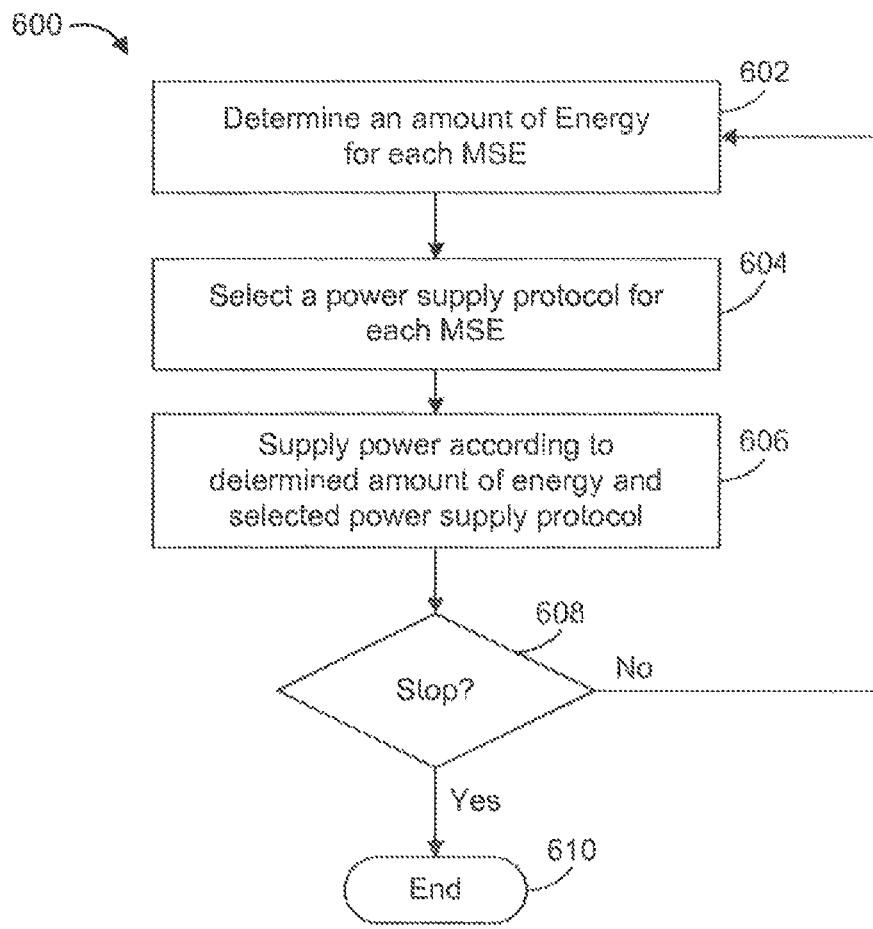
FIG. 4 is a flowchart of a method of applying energy according to some embodiments of the invention.

FIG. 4 is a flowchart of a method 600 of applying energy to an object according to some embodiments of the invention. In step 602, amounts of energy to be supplied at each MSE may be determined. Determining the amount of energy may include reading the amount of energy from a pre-programmed lookup table, receiving the amount of energy via an interface, calculating the amount of energy according to pre-programmed procedures (e.g., by a processor or controller preprogrammed to calculate amounts of energy), or in any other manner which allows determining amounts of energy.

In some embodiments, determining the amount of energy may include receiving, e.g. from one or more detectors, power measurement results pertaining to power detected to be emitted into cavity 10 by the one or more radiating elements and power detected to exit cavity 10. Determining the amount of energy may further include estimating or determining (e.g., by calculating) a value indicative of energy absorbable in the object, (which, for brevity, may be referred to below as an absorbability indicator or, in acronym, AI) and determining, based on this value, an amount of energy. The absorbability indicator may be determined at each MSE- and the amount of energy at an MSE(i) may be determined based on the absorbability value determined at the same MSE AI(i).

Determining an amount of energy based on an AI may include searching a lookup table, where energies may be associated with AIs, or evaluating the value based on a mathematical function of AI, and in some embodiments, also of other variables.

In some embodiments, the amount of energy determined may decrease as the AI increases. For example, in some embodiments, the amount of energy E may be determined by evaluating the function $E=E_0/AI$, where $E_0$ may be a preprogrammed value, a value received via an interface, or a value determined in any other manner; and AI may be determined from power measurement results as discussed above. In some embodiments, other functions may be used, for example, $E=E_0 e^{-AI/A_0}$, where the value of $A_0$ may be determined in any of the ways that $E_0$ may be determined, as discussed above. Other functions of AI may also be used, for example, linear functions, higher polynomials (of order 2 or greater), trigonometric functions, step-functions, or any other kind of function. It was found that functions that inversely relate to AI (i.e. decreasing functions) may be preferred for achieving uniform heating.

In some embodiments, the functions may depend on the value of AI, for example, for some values of AI one function may be used, and for other values of AI, another function may be used. For example, in some embodiments, frequencies may be classified to on-peak frequencies and off-peak frequencies. On peak frequencies may be frequencies at which (or at nearby frequencies) the AI vs. frequency graph has a local maximum. Off peak frequencies may be frequencies located away from local maximums in the AI(f) graph. In yet another example, frequencies may be classified according to the relation between the AI values associated with them and an AI threshold. For example, frequencies having corresponding AI values above a threshold may be classified into one group (e.g., "on peak") and frequencies having corresponding AI values below the threshold may be classified into another group (e.g., "off peak"). Determination of energy at on-peak frequencies may be in accordance with a different function than at off-peak frequencies. For example, they may both be determined using exponential functions, but with different values of $A_0$ and/or of $E_0$. In another example, energies to be applied to non-peak frequencies may be determined using a linear function; and energies to be applied to non-peak frequencies may be determined using a higher polynomial function.

In some embodiments, there may be only a single radiating element, and the determined amount of energy may be supplied to that radiating element. In some embodiments, there may be two or more radiating elements, and in some embodiments—each may emit at a different frequency to minimize interactions between them. Further, the amount of energy supplied to one of the two or more radiating elements may be determined independently of the amount of energy supplied to the other.

In some embodiments, there may be two or more radiating elements that emit at the same frequency but with a phase difference between them (e.g. 0°, 90°, or any other phase value). In these cases, an amount of energy supplied to one of the two or more radiating elements may be determined based on the amount of energy supplied to another radiating element. In some embodiments, the relation between the amounts of energy supplied to each of the two or more radiating elements may be predetermined (for a given MSE), and the determined amount of energy may be distributed between the various radiating elements in accordance with this predetermined relation.

At step 604, a power supply protocol may be selected for each MSE. In some embodiments, the power supply protocol may be selected from two available protocols. In some embodiments, more protocols, for example, 3, 4, 5, or any other number of protocols (larger than 1) may be available for selection. Selecting a protocol may include selecting according to a rule. For example, the rule may dictate that for all MSEs of a given group (e.g. all MSEs wherein the phase between signals emitted by two radiating elements is 90°, or all MSEs having a frequency in a certain range, etc.) the same power supply protocol may be selected. In other examples, the rule may include dependency on power measurement results. For example, the rule may be that for MSEs having an AI in a first range, a first protocol is applied, and for MSEs having an AI in another range, another protocol may be applied. In another example, in some embodiments, different protocols may be selected for in-resonance and off-resonance MSEs, e.g., in-resonance and off-resonance frequencies. In-resonance frequencies may be, for example, frequencies associated with a real input impedance at one or more of the radiating elements (that is, input impedance with 0 imaginary part), and off-resonance frequencies may be, for example, frequencies associated with a complex input impedance on one or more of the radiating elements. The terms "in resonance" and "off resonance" do not necessarily refer to frequencies at which there is physically a resonance between the RF wave and the object and/or the cavity.

In some embodiments, the selection of a power supply protocol for a particular MSE may be in accordance with a value indicative of energy absorbable by the object (AI) at the same MSE. For example, in some embodiments, one protocol may be selected for MSEs associated with AI values smaller than a threshold, and other protocols may be selected for other MSEs.

In some embodiments, a power supply protocol may be selected for an energy application event in accordance with a preceding energy application event. For example, if a first energy application event includes a long power supply at high power level, a power supply protocol beginning with a time delay may be selected for the subsequent event. In this context, "long" and "high" may be, for example, above a threshold.

A power supply protocol may include any rule that determines how the supplied power may change over time for supplying the determined amount of energy. The time period, for which the power supply protocol provides power supply instructions may be referred to as occurring over an "energy application event". For example, the power may be constant for the entire energy application event, or it may vary during the energy application event. In some embodiments, each energy application event may be limited to power application at a single frequency.

One exemplary power supply protocol may provide a power level, which, together with the determined amount of energy, may dictate a power supply duration. Another exemplary power supply protocol may provide a power supply duration, which, together with the determined amount of energy, may dictate a power supply level. In some embodiments, the power supply protocol may provide for a variation of the supplied power over time, for example, it may provide for applying the power at a power level that increases and/or decreases at a certain linear or non-linear rate. In some embodiments, the power supply protocol may provide for pulsed power supply. These and others are discussed in more detail below.

In step 606, power is supplied to the one or more radiating elements to provide the amount of energy determined in step 602 according to the power supply protocol selected in step 604. In some embodiments, power is supplied. In only a sub-set of the MSEs for which an amount of energy was determined and a power supply protocol was selected. For example, in some embodiments, the energy determined to be supplied at some of the MSEs may be below some predetermined limit (e.g., may be 0), and in these MSEs, power supply may be reduced or avoided. In some cases, other considerations may affect whether or not to supply power at particular MSEs. These considerations may include, for example, hardware considerations (e.g., if the hardware is incapable of or inefficient at supplying energy in these MSEs), or any other consideration.

In some embodiments, after power is supplied to the MSEs in step 606, a stopping criterion may be checked in step 608.

For example, the stopping criterion may include a predetermined total amount of energy to be supplied to radiating elements, and if the total amount of energy supplied is smaller than the predetermined amount, the stopping criterion is not met. In another example, the stopping criterion may include a total amount of energy that may be absorbed in the object. In such embodiments, an estimate of the total amount of energy absorbed by the object may be determined (e.g. by multiplying supplied amounts of energy with corresponding values of AI, and summing over all the energy application events that occurred so far in the energy application process), and if smaller than the predetermined amount, the stopping criterion is not met. Other stopping criterions may also be used, and the invention is not limited to any kind of stopping criterion.

If the stopping criterion is met, energy application may stop (610). In other cases, control may return to step 602 and energy application may be continued in accordance with steps 602, 604, and 606 until the stopping criterion is met. In some embodiments, steps 602-606 may be repeated a plurality of times while processing the object—for example: until a stop signal is received, e.g., from a user interface.

Each power supply protocol may provide a time distribution of power supply during an energy application event. The time distribution may be provided parametrically. Values of some of the parameters may be provided by the power supply protocol, and some may be determined independently of the power supply protocol, for example, according to the MSE for which the protocol is selected, with or without consideration of the AI associated with this MSE.

Figure 5A:
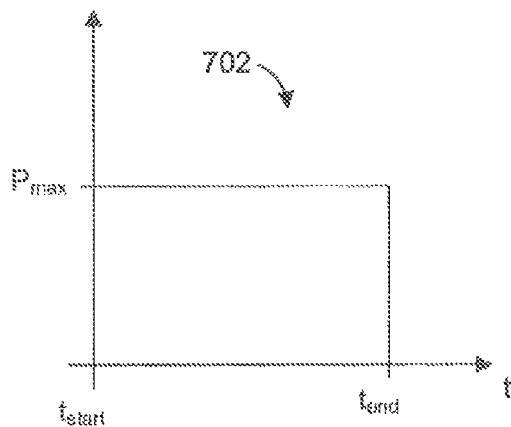
FIGS. 5A to 5G are graphical representations of an power supply protocols according to some embodiments of the invention.

FIG. 5A is a graphical representation of an exemplary power supply protocol 702. According to power supply protocol 702—the supplied power (P) is constant in time, at a power level of $P_{max}$, which is the maximal power available to apparatus 100 at the MSE in question. In some embodiments, $P_{max}$ may be the same for all the MSEs, however, in many systems, $P_{max}$ may be MSE dependent. Processor 2030 may determine the value of $P_{max}$ for each MSE, for example, from a preprogrammed lookup table.

According to power supply protocol 702, power is supplied at power level $P_{max}$ from the beginning of the energy application event at $t=t_{start}$, until the end of the energy application event, at time $t_{end}=E/P_{max}$ (wherein E is the amount of energy determined for application at the same MSE, e.g. at step 602, FIG. 4).

Selecting protocol 702 for all the MSEs may result in time-efficient power application, since at each MSE, power is supplied at the maximum available power level. In some embodiments, protocol 702 may also offer the shortest time at which the predetermined amount of energy may be provided at each energy application event, and the shortest time a stopping criterion may be met. However, for heating some objects, such time-efficient energy application may result in less uniform heating than may be achieved by selecting, for at least some of the MSEs, a different power supply protocol.

Figure 5B:
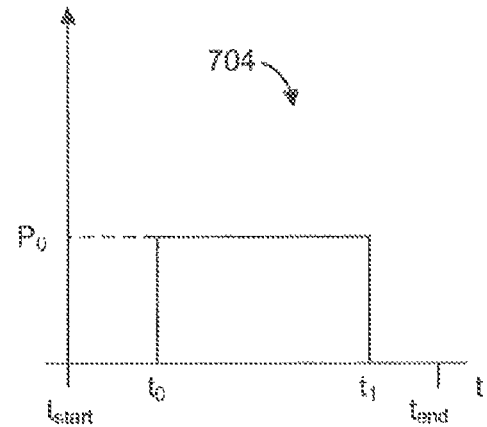

FIG. 5B is a graphical representation of another exemplary power supply protocol 704. In protocol 704 the constant power level is $P_0$, which may be different from $P_{max}$. In some embodiments, $P_0$ may be the same for all MSEs. In some embodiments, $P_0$ may be different for different MSEs, and the association of different $P_0$ values to MSEs may be preprogrammed. Alternatively or additionally, this association may be determined during energy application.

Protocol 704 also has a duty cycle smaller than 100%. For example, this may be implemented by delaying the start of power application to occur later than the beginning of an energy application event. While the event begins at $t=t_{start}$, power supply begins at to. Similarly, the event ends at $t_{end}$, but power supply ends at $t_1=t_0+E/P_0$, which occurs earlier than ten. Thus, the duty cycle (i.e. the portion of the energy application event at which power is supplied) is $$\frac{\varepsilon/P_0}{t_{end} - t_{start}}.$$

Power supply protocol 704 may impose a time delay before energy application begins, and another time delay, after energy application ends, at the end of the energy application event (and before another energy application event may begin, at another MSE).

Some protocols may include time delay only at the beginning or only at the end of an energy application event.

Figure 5C:
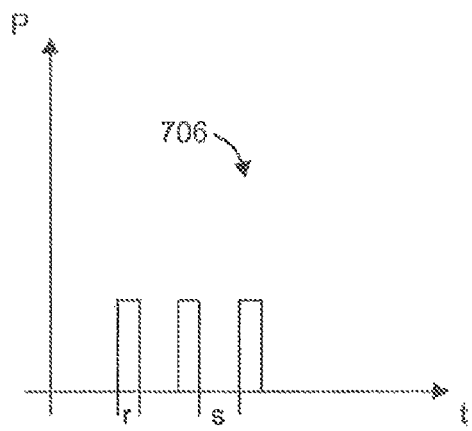

FIG. 5C is a graphical representation of another exemplary power supply protocol 706. Protocol 706 includes a time delay before energy application commences, similar to protocol 704. However, protocol 706 provides pulsed power supply. Power is supplied, beginning at time $t_0$ at a series of n pulses spaced apart from each other by a time interval s, each of equal duration r, which may be given by the expression r=E/nP, wherein P and n may be provided by protocol 706, and E may be determined independently of the protocol. For example, P may be set as $P_{max}$.

In other embodiments, different pulses may have different durations and/or power levels. Each two pulses in protocol 706 may be spaced apart from each other by a time interval s. In some embodiments, the power supply protocol may provide the length of intermissions, s, as a function of r (e.g. s=r, s=2r, or any other function).

Figure 5D:
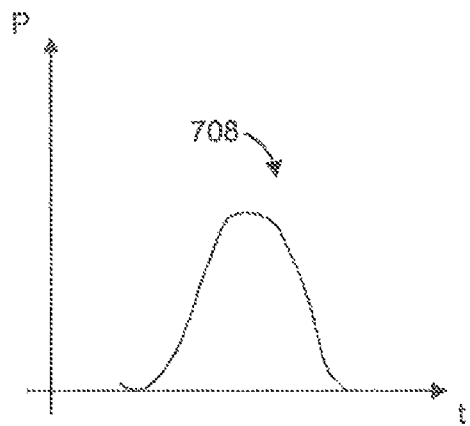
Figure 5E:
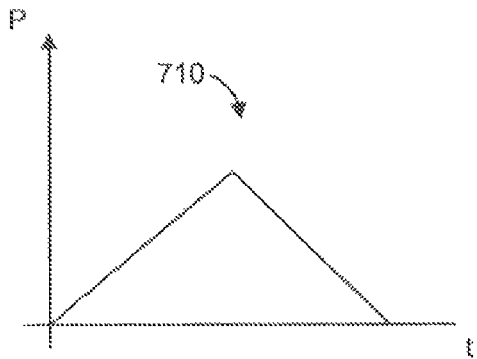
Figure 5F:
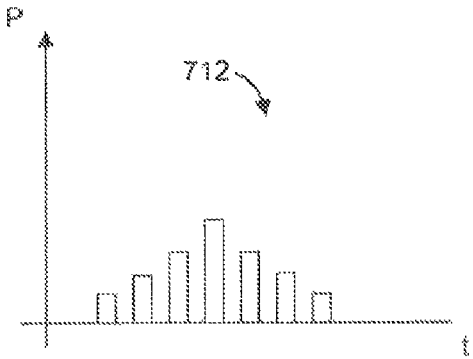
Figure 5G:
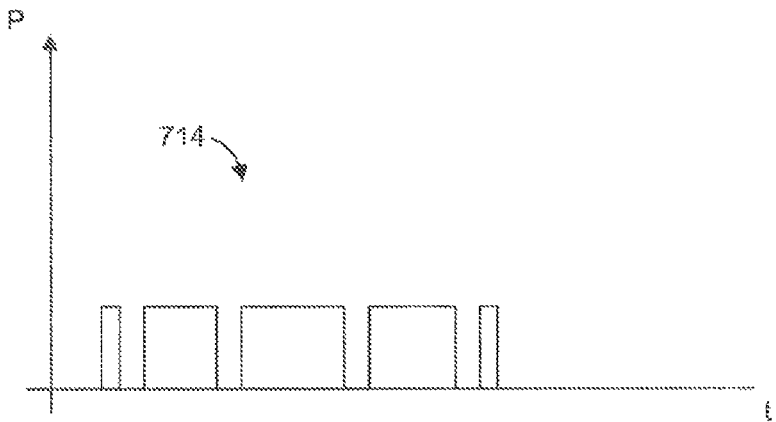

FIG. 5D is a graphical representation of another exemplary power supply protocol 708. Protocol 708 provides power of differing levels at differing times within the energy application event. In the embodiment shown, protocol 708 provides power that changes continuously and smoothly. Other exemplary power supply protocols are graphically represented in FIG. 5E, showing protocol 710, wherein the power changes linearly in time, at first increases, and then decreases. In FIG. 5F, protocol 712 provides pulses of varying power, and in FIG. 5G, protocol 714 provides pulses of differing durations. It is noted that the supplied energy may be equated with the sum of multiplicative products of time by power, so each of the protocols may be adjusted to supply a predetermined amount of energy by normalizing application times and/or power levels.

Figure 6A:
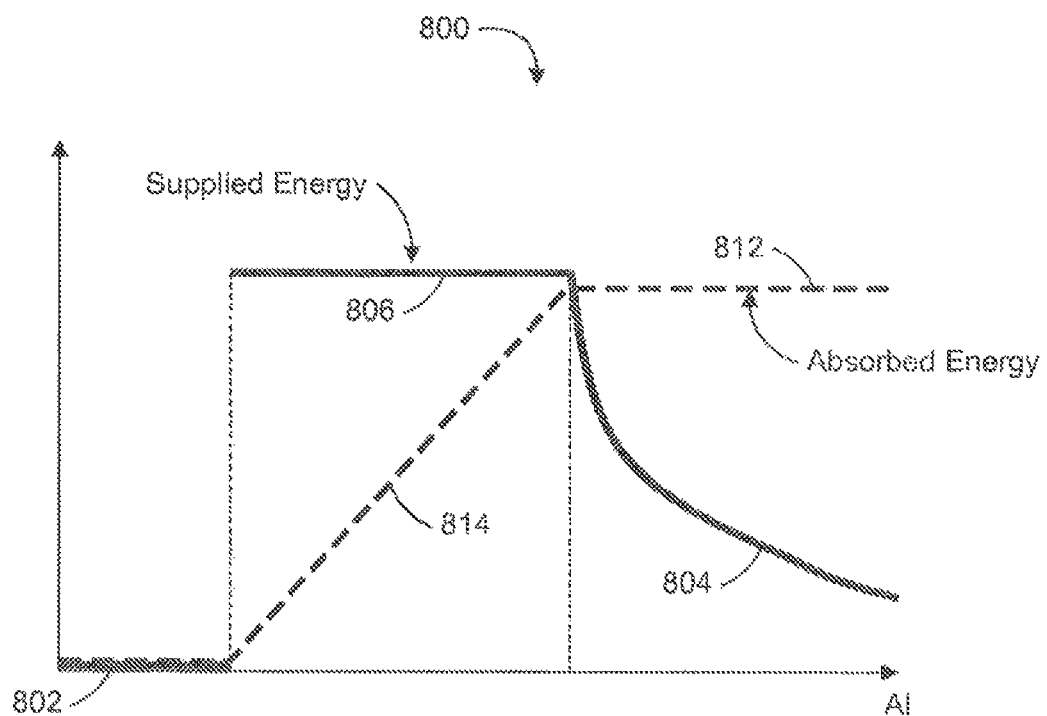
FIG. 6A is a graphical representation of an energy application protocol according to some embodiments of the invention.

FIG. 6A is a graphical representation of an energy application protocol 800 according to some embodiments of the invention. An energy application protocol may include one or more rules for associating amounts of energy to MSEs based on AI values associated with the respective MSEs. Energy application protocols may be used for determining amounts of energy for each MSE, for example, in step 602, FIG. 4. FIG. 6A shows the amounts of energy associated with the MSEs as a function of the AI values associated with the respective MSEs (solid line), and the amounts of energy expected to be absorbed by the object at the respective MSEs (dashed line).

Figure 6B:
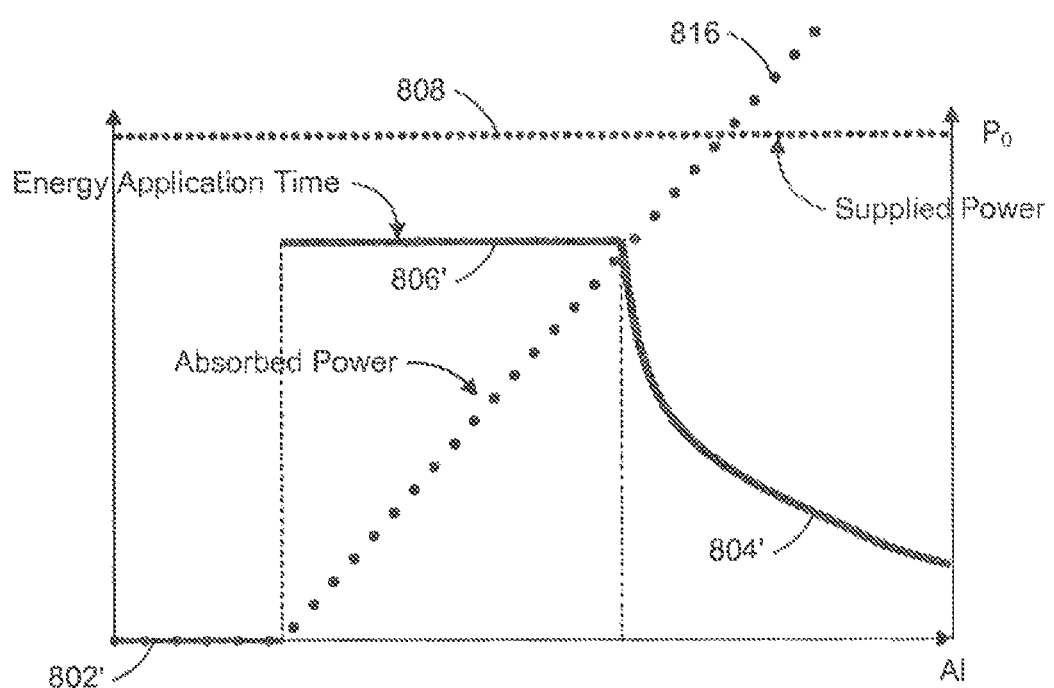
FIGS. 6B-6E are graphs showing power levels and energy application durations that may result from selection of various power supply protocols under a common exemplary energy application protocol.
Figure 6C:
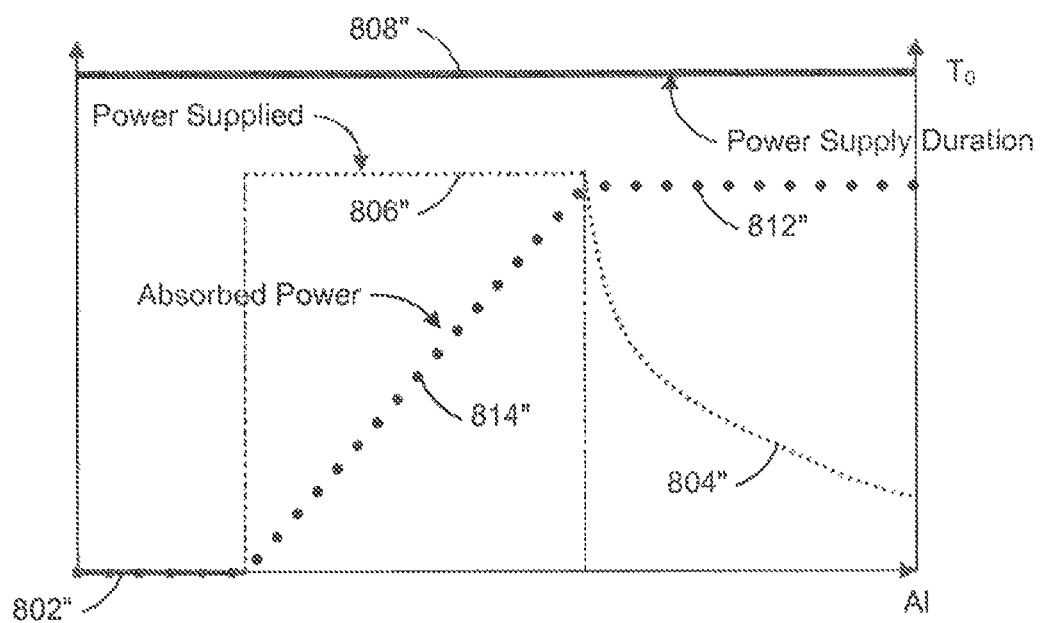
Figure 6D:
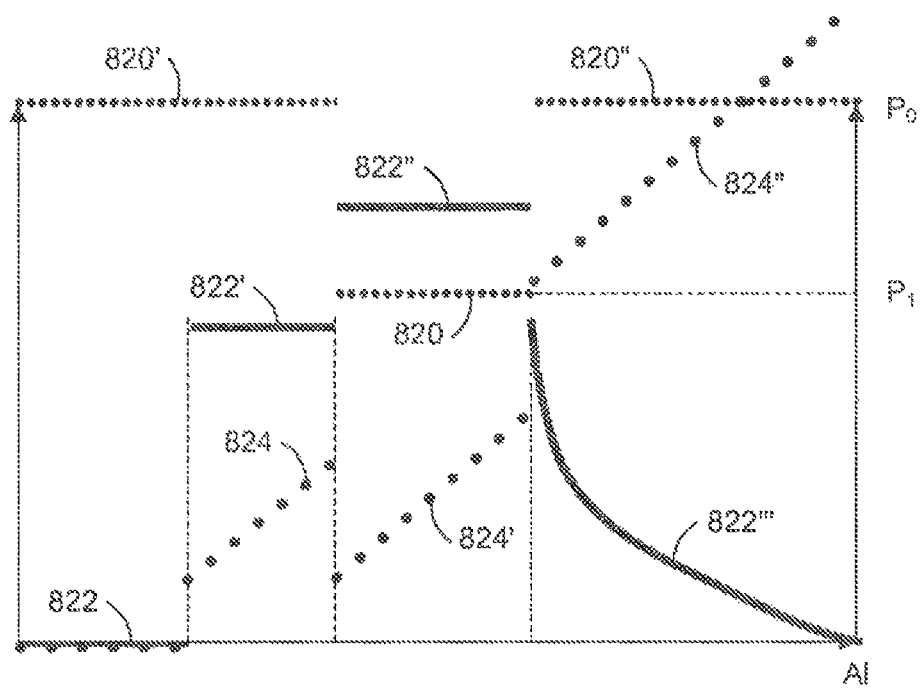

Each of FIGS. 6B to 6E shows power levels and energy application durations that may result from selection of various power supply protocols, for example, when the amounts of energy to be supplied are determined in accordance with the energy application protocol of FIG. 6A. In FIGS. 6B and 6C a common power supply protocol is selected for all MSEs (in FIG. 6B the same power level is used for all MSEs and in FIG. 6C the same time duration is used for all the MSEs), and in FIGS. 6D and 6E, differing power supply protocols are selected for differing MSEs. FIGS. 6B, 6C, and 6D also show amounts of power expected to be absorbed at MSEs associated with differing AI values according to the selected power supply protocols.

The data in FIGS. 6A to 6E are presented graphically in accordance with the absorbability indicator (AI), such that MSEs having the same AI are all represented by a single point on each line. This allows ordering the MSEs along a single axis, even though the MSEs themselves may be multidimensional. This graphical representation is convenient to illustrate cases where energy determination and power supply protocol selection both depend on AI. The invention, however, is not limited to these cases.

In the example provided by FIG. 6A, the amounts of energy to be applied at MSEs associated with different AI values according to energy application protocol 800 are shown by a solid line made of sections 802, 806, and 804. According to protocol 800, at MSEs where the values of the AI are low and only small portions of the supplied energy may be absorbed by the object (section 802), energy is not supplied. At section 804, where the AI has the highest values and energy may be absorbed by the object most efficiently, the amounts of energy supplied according to protocol 800 may decrease as the AI value increases. At MSEs where the AI has intermediate values (section 806), a constant amount of energy may be determined to be applied according to protocol 800.

The absorbed energy, if estimated as a multiplicative product of the supplied energy and the AI, is shown in a dashed line, including sections 812 and 814. At higher AI values, the dashed line is substantially horizontal (812), which may be the case if the applied energy illustrated in section 804, is proportional to 1/AI. If section 804 describes another kind of decreasing function (e.g., $e^{-AI}$), the absorbed energy at the highest AI values may be represented by a line that is not straight and/or not horizontal.

At intermediate AI values, the absorbed energy may be represented by a substantially diagonal straight line (814), since it may be estimated as a multiplicative product of the constant amount of energy applied, represented by the horizontal section 806, by the AI.

At the lowest AI values, where no energy is supplied, no energy is absorbed, as shown by the horizontal dashed section overlapping with section 802.

FIG. 6B is a graphical representation of energy application times, also referred to herein as power supply durations, at MSEs of different AI values, as may be determined for supplying the amounts of energy dictated by protocol 800 of FIG. 6A according to selected power supply protocols and according to some embodiments of the invention. The selected power supply protocols are the same for all the MSEs and dictate applying the energy at the same power level at each MSE, irrespective of the AI value with which it is associated, as illustrated by line 808.

Since the power level at which energy is supplied is constant, the time durations, for which energy is supplied at different MSEs may follow the amounts of energy to be supplied at the different MSEs. This is illustrated in FIG. 6B by line sections 802', 804' and 806', which represent the energy application durations and follow line sections 802, 804, and 806 of FIG. 6A.

FIG. 6B also shows the amounts of power expected to be absorbed when applied at the different MSEs. These amounts of power are shown by the dotted line.

At the lowest AI values, where no energy is applied (see section 802 in FIG. 6A and corresponding section 802' in FIG. 6B), no power is absorbed, as shown by the dotted line overlapping with section 802'.

At all other AI values, the amounts of power expected to be absorbed change linearly with the AI value, as shown by section 816 of the dotted line. This is consistent with estimating the absorbed power as the multiplicative product of the AI value by the supplied power, as it is assumed that $P_{abs}=P_{supplied}*AI$.

FIG. 6C is a graphical representation of power supply durations (also referred to herein as energy application times) at MSEs of different AI values, as may be determined for supplying the amounts of energy dictated by protocol 800 of FIG. 6A according to selected power supply protocols and according to some embodiments of the invention. The power supply protocols selected in FIG. 6C are common to all the MSEs and dictate applying the energy during equal time periods of To time units at each MSE, irrespective of the AI value with which the MSE is associated, as illustrated by line 808". It is noted that line 808" depicts time durations, while line 808 of FIG. 6B depicts power levels.

Since the time periods during which energy is supplied is constant over the different MSEs, the power levels, at which energy is supplied at different MSEs may follow the amounts of energy to be supplied at the different MSEs. This is illustrated in FIG. 6C by line sections 802", 804" and 806", which represent the power levels and follow line sections 802, 804, and 806 of FIG. 6A.

The expected absorbed power, which may be estimated as the multiplicative product of the AI value by the supplied power, may be illustrated by the dotted line in FIG. 6C. It may be noted that when the power supply protocols are selected as illustrated in FIG. 6C, the absorbed power may have similar tendencies as the absorbed energy. This may be illustrated by sections 812" and 814" following sections 812 and 814, respectively, of FIG. 6A.

Selecting the power supply protocols as illustrated in FIG. 6C may result in energy application intermissions of length $T_0$ whenever energy is to be applied at MSEs having AI values associated with 0 energy application.

FIG. 6D is a graphical representation of energy application times (solid lines) at MSEs of differing AI values, as may be determined for supplying the amounts of energy dictated by protocol 800 of FIG. 6A according to selected power supply protocols and according to some embodiments of the invention. The power supply protocols selected in FIG. 6D include power application at power level $P_1$ (section 820) and at power level $P_0$ (sections 820' and 820").

The time durations, for which energy is supplied at different MSEs to apply energy according to energy application protocol 800 of FIG. 6A, may track the amounts of energy to be supplied at the different MSEs, but may also be shifted from each other in accordance with the power level used (either $P_0$ or $P_1$). This is illustrated by the solid lines in FIG. 6D, which include sections 822, 822', 822", and 822'''. Section 822 corresponds to section 802 in FIG. 6A—since no energy is supplied at these AI values, energy application time may also be zero. Section 822''' corresponds to section 804 in FIG. 6A. Since at these AI values the power level is the same irrespective of the AI value, the energy application time tracks the amounts of energy to be applied, and section 822''' tracks section 804.

As for the intermediate AI values, they are divided into two groups: in a first group, $P_0$ is used, and in the second group, $P_1$ is used. This may result in the energy application time having one value at the first group and another value at the second group, as illustrated by sections 822' and 822". Since $P_1$ is less than $P_0$, and the amounts of energy to be applied are the same (see Section 806 in FIG. 6A) energy is applied for longer times at $P_1$ than at $P_0$, as shown by the respective positions of sections 822' and 822".

FIG. 6D also shows the amounts of power expected to be absorbed at the differing MSEs. These amounts of power are shown by the dotted line including sections 824, 824' and 824".

At the lowest AI values, where no energy is supplied (see section 802 in FIG. 6A), no power is absorbed, as shown by the dotted line overlapping with section 822.

At all other AI values, the amounts of power expected to be absorbed change linearly with the AI value, as shown by sections 824, 824', and 824". Sections 824 and 824" are parts of the same straight line, but section 824' is shifted to lower values, because the supplied power shifts to lower values (see sections 820 and 820').

Figure 6E:
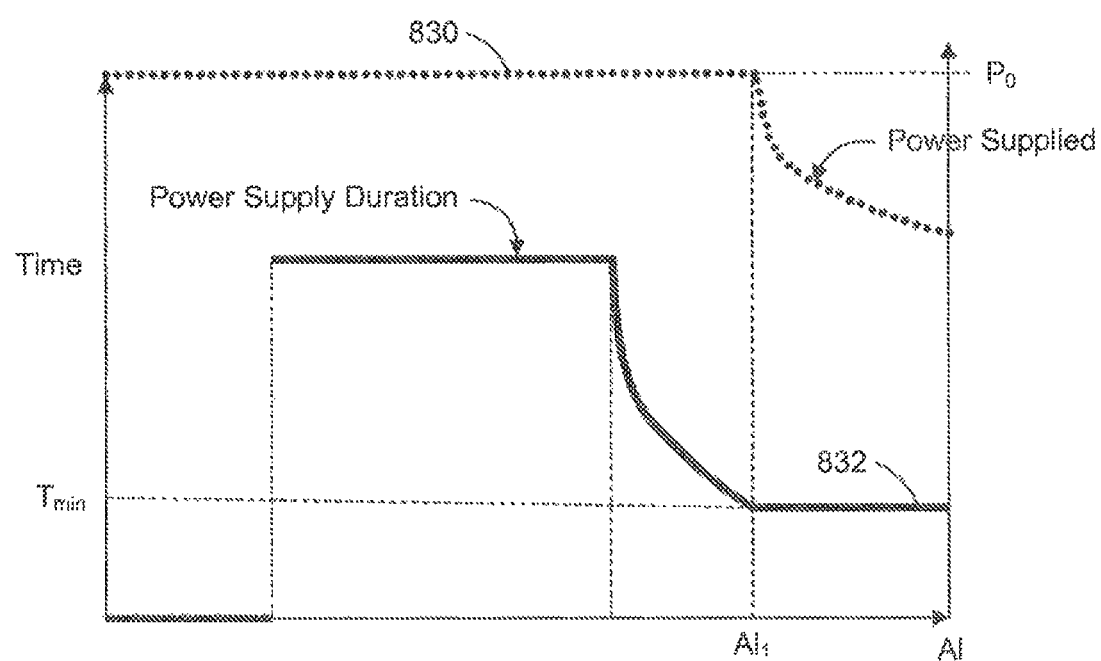

FIG. 6E is a graphical representation of energy application times (solid lines) at MSEs of differing AI values, as may be determined for supplying the amounts of energy dictated by protocol 800 of FIG. 6A according to selected power supply protocols and according to some embodiments of the invention. The power supply protocols selected in FIG. 6E include power application at a power level of $P_0$ (section 830 of the dotted line) for AI values smaller than $AI_1$, and at time duration $T_{min}$ at AI values larger than $AI_1$ (section 832 of the solid line). When the power supply protocols dictate energy application at a given power level (at AI values smaller than $AI_1$), the time durations track the amounts of energy to be applied, similarly to the solid line in FIG. 6B, and when the power supply protocols dictate energy application at a given time period (at AI values larger than AI), the power levels track the amounts of energy to be applied, similarly to the dashed line in FIG. 6C.

As demonstrated in FIGS. 6D and 6E, selecting different power supply protocols for different ranges of MSEs (e.g., for MSE ranges characterized by differing AI value ranges) may result in the power level and/or time duration of power application changing differently than the amounts of energy to be supplied at the corresponding MSEs. For example, in FIG. 6E the power level does not track the applied energy: when the energy starts decreasing, the power stays constant. Similarly, the time application does not track the applied energy: the time remains constant at the highest AI values, while the applied energy drops. Similar phenomena may be observed in FIG. 6D, where the power and time at the middle of the intermediate AI range change, while the determined amounts of energy remain unchanged along the same range of AI values.

Figure 7A:
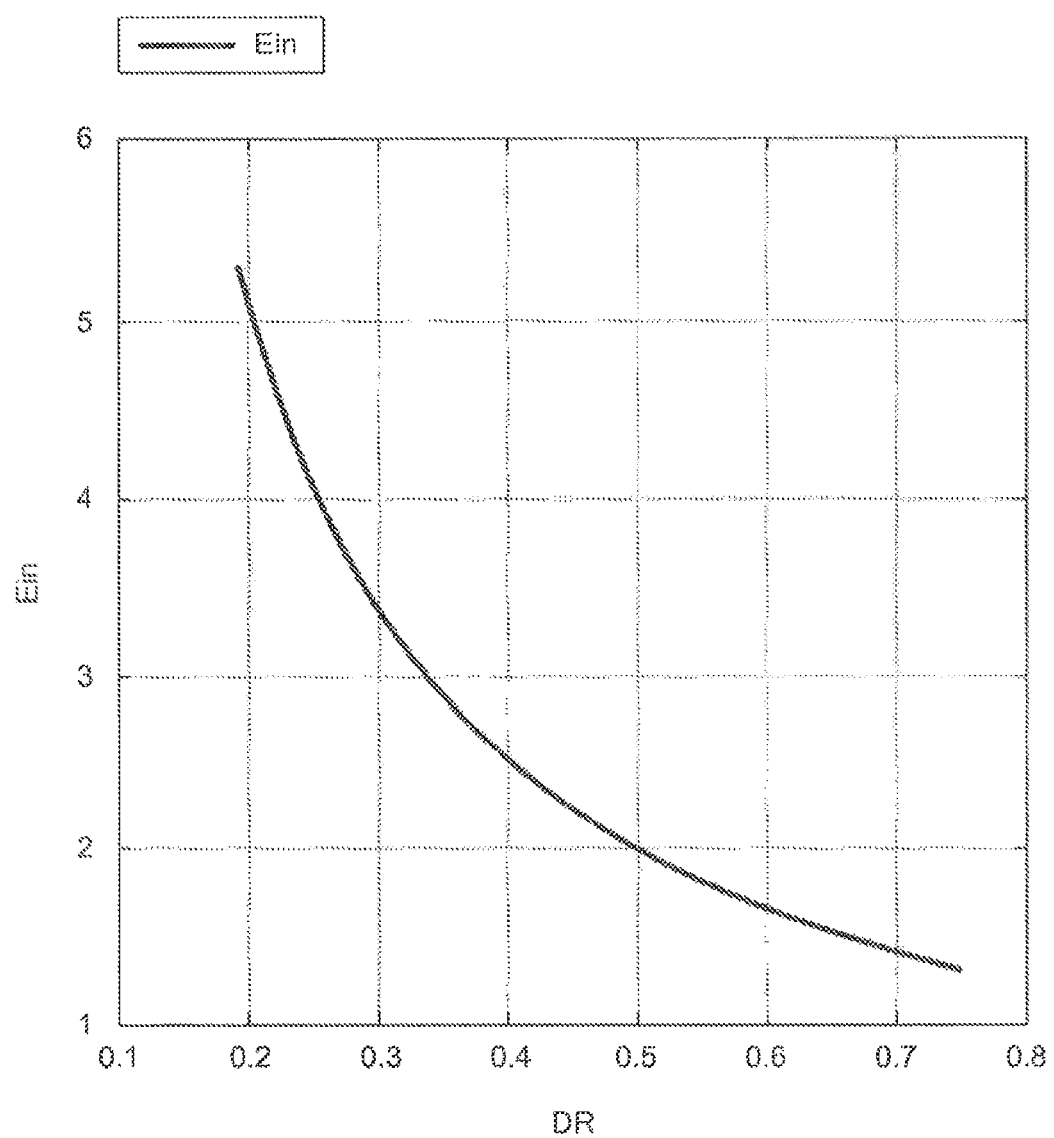
FIG. 7A is a graphical representation of an energy application protocol according to some embodiments of the invention.

FIGS. 7A to 7D provide an example of how energy application times and power may vary under given energy application and power supply protocols in a real life case. FIG. 7A graphically represents an energy application protocol, according to which, a multiplicative product of the amount of energy supplied at each MSE and a value of an absorbability indicator (in this example—DR) associated with each respective MSE is constant. According to such energy application protocol, it may be assumed that the absorbed energy at each MSE is the same. Such energy application protocols, when used on all or part of the MSEs were found by the applicants to provide more uniform heating than some other energy application protocols.

Figure 7B:
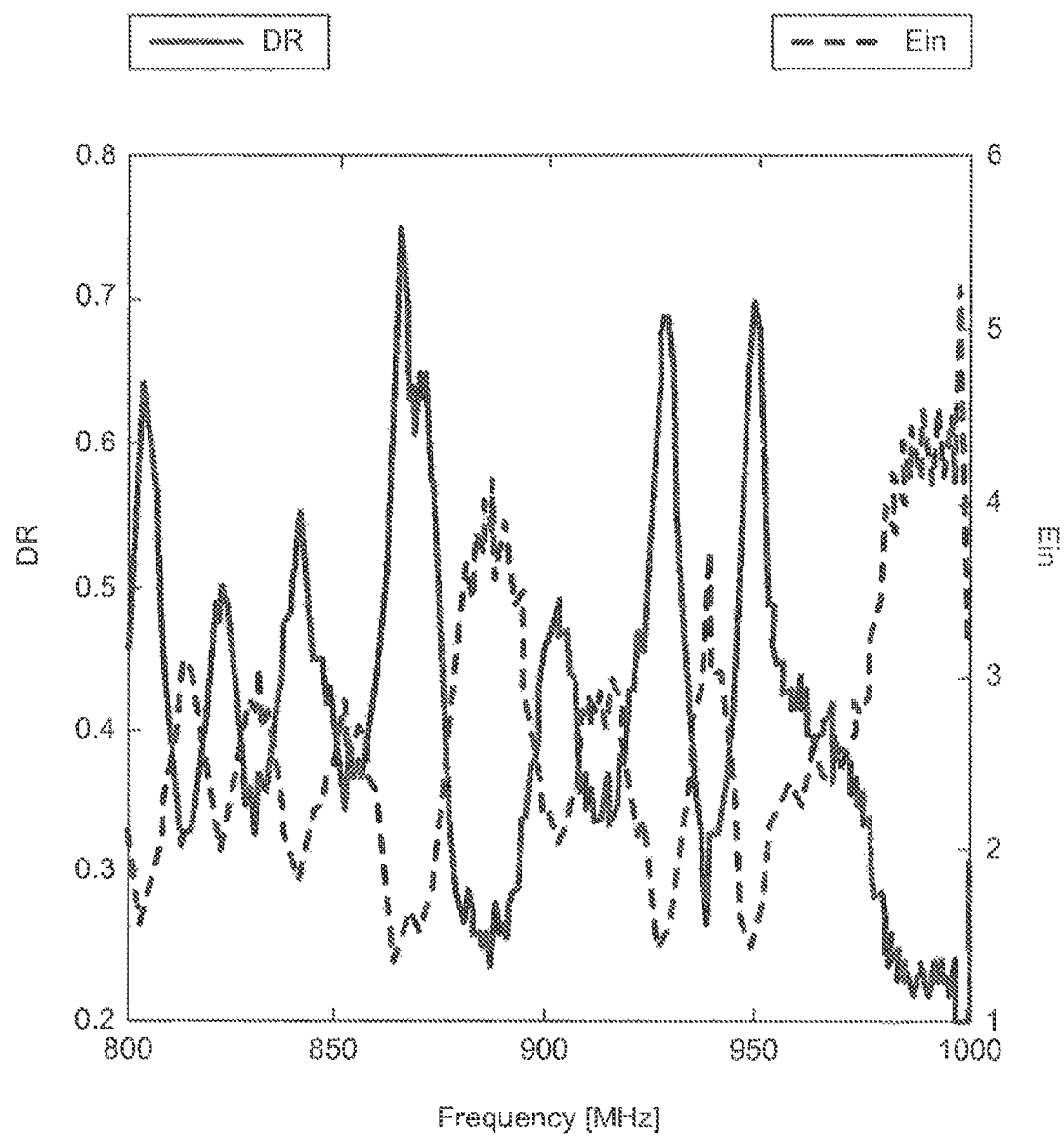
FIG. 7B is a graphical representation of dissipation ratio values, measured at various frequencies, and amounts of energy determined to be applied at the same frequencies based on measured DR values and an exemplary energy application protocol.

FIG. 7B shows, in solid line, absorbability indicators measured from a frozen pizza over a plurality of MSEs. The absorbability indicator measured was the dissipation ratio (DR), and the MSEs were defined, at least in part, by the frequency. DR values were measured at frequencies of between 800 MHz and 1000 MHz at 0.5 MHz steps.

FIG. 7B also shows, in dashed line, amounts of energy determined to be supplied to a radiating element at each of the MSEs, based on the measured DR values appearing in solid line and the energy application protocol depicted in FIG. 7A. In practice, at each MSE, the AI value may be determined from the solid line in FIG. 7B. Then, the amount of energy to be applied at each respective MSE may be determined using FIG. 7A by finding the energy value that is associated with the determined AI value.

Figure 7C:
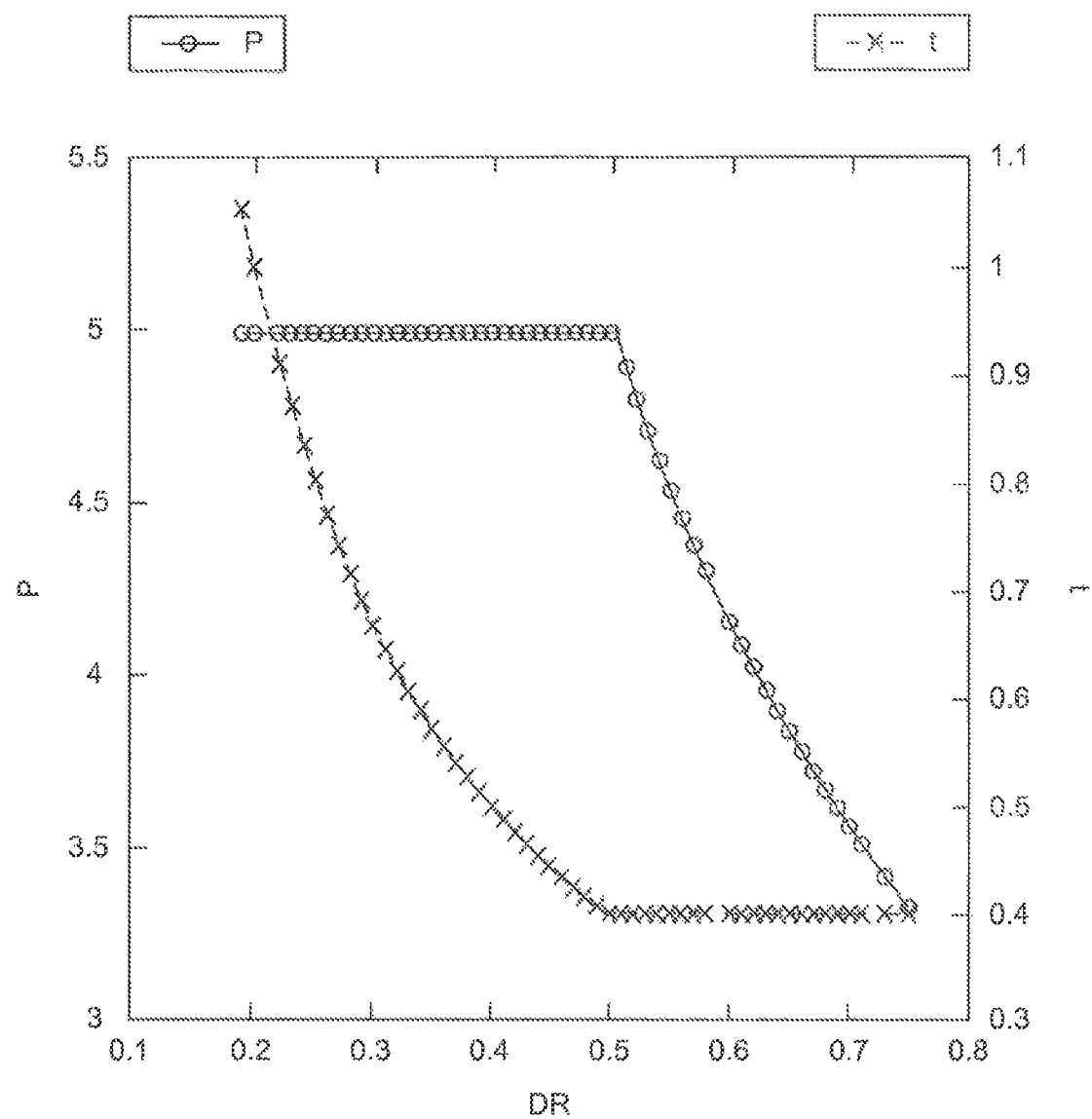
FIG. 7C is a graphical representation of possible selections of power supply protocols for differing MSEs based on AI values according to some embodiments of the invention.

FIG. 7C is a graphical representation of possible selections of power supply protocols for differing MSEs based on AI values (in this example—DR values). According to the selections shown in FIG. 7C, a power supply protocol that dictates power supply at power level $P_0$ (=5) is selected for MSEs with AI values for which $P_0/AI > t_{min}$, (where $P_0=5$ and $t_{min}=0.4$). The time values shown in the figure for these AI values were computed as $t(AI)=E(AI)/P_0$, where $E(AI)$ was the energy value associated with the corresponding AI value by FIG. 7A. To select P and t values for an MSE characterized by a certain DR, using FIGS. 7A and 7C the processor may select for each MSE characterized by a certain DR value P and t value as summarized in FIG. 7C. For example, if DR=0.4 the selected power will be $P_0$ and the selected time will be $E(0.4)/P_0$ (in this example: 5 and 0.5). The value 0.5 is calculated based on FIG. 7A, in which $E(0.4)=2.5$, but the use of FIG. 7C obviates the need to use FIG. 7A). This is in accordance with power supply protocol characterized by a predetermined power level $P_0=5$. For an MSE with DR=0.6, the selected power and time will be 4 and 0.4, in accordance with a power application protocol characterized by a predetermined power application duration of 0.4.

For other AI values, at which $P_0/AI \leq t_{min}$, a power supply protocol that dictates power supply at power level of $E(AI)/t_{min}$ is selected according to the selection shown in FIG. 7C. The energy application time at these MSEs is $t_{min}$. The power values shown in the figure for these AI values were computed as $P(AI)=E(AI)/t_{min}$, where $E(AI)$ was the energy value associated with the corresponding AI value by FIG. 7A. This selection of power supply protocols is qualitatively similar to that described in FIG. 6E. The energy application protocol of FIG. 7A, however, is different from that of FIG. 6A.

Figure 7D:
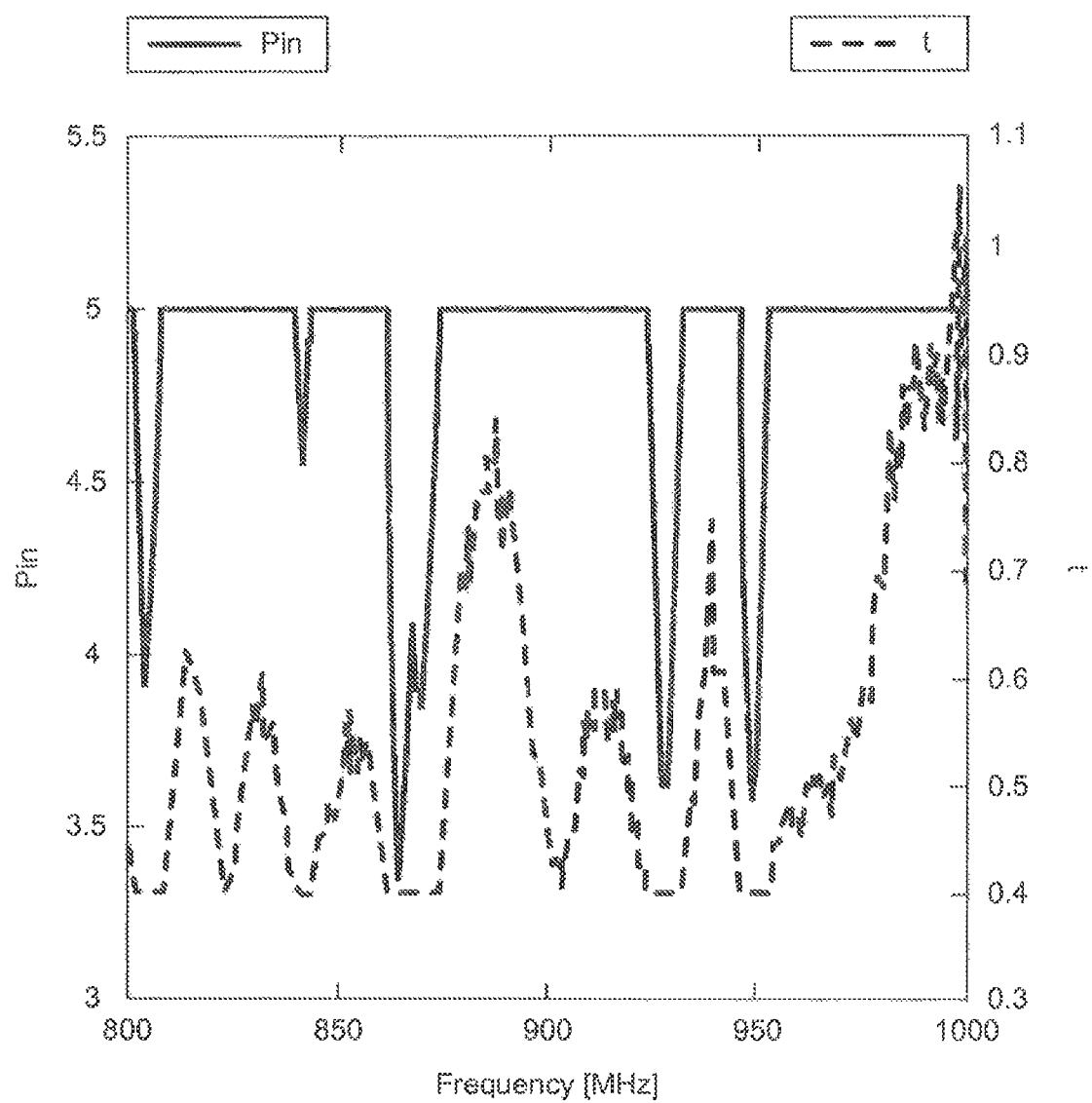
FIG. 7D is a graphical representation of power to be supplied and time durations of power supply when exemplary power supply protocols are selected for applying energy according to exemplary determined amounts of energy to be applied at differing MSEs.

FIG. 7D shows the supplied power and time durations according to the power supply protocols selected according to FIG. 7C and the energy application protocol depicted in FIG. 7A for providing energy as depicted in the dashed line of FIG. 7B. The time (dashed line in FIG. 7D) and power (solid line) are shown along the vertical axes, and the differing MSEs are represented along the horizontal axis. As shown, for most of the MSEs, the selected power supply protocol dictated the use of power level $P_0(=5)$; and the time duration changed to provide the determined energy levels. In some MSEs, however, the time duration was constant at duration of $t_{min}(=0.4)$, and in these MSEs the power to be supplied dropped. This selection of power supply protocols may allow time efficient power supply without requiring supply of power for durations shorter than a minimal threshold $t_{min}$.

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. For example, one or more steps of a method and/or one or more components of an apparatus or a device may be omitted, changed, or substituted without departing from the scope of the invention. Thus, it is intended that the specification and examples be considered as exemplary only, with a true scope of the present disclosure being indicated by the following claims and their equivalents.

What is claimed is:

1. An apparatus for applying electromagnetic energy to an object in an energy application zone at a plurality of modulation space elements (MSEs), each modulation space element being a set of one or more values, each of a variable that may affect a field pattern excited in the energy application zone and is controllable by the apparatus, the apparatus comprising:
a power source configured to generate and supply RF energy;
one or more antennas configured to transmit the RF energy supplied by the power source, to a cavity, under control of at least one processor and;
the at least one processor,
wherein the at least one processor is configured to:
determine an amount of energy to be supplied to one or more of the antennas at each of the plurality of MSEs;
select at least one power supply protocol for each of the plurality of MSEs, wherein at least two of the power supply protocols selected for different MSEs differ, at least one of the at least one power supply protocol including at least one rule for setting intermissions in the transmission of RF energy; and
cause electromagnetic power supply to one or more of the antennas in at least a subset of the plurality of MSEs, based on the determined amount of energy and based on the selected power supply protocol.

2. The apparatus of claim 1, wherein the the at least one rule delimits or determines at least one power level; at least one energy application duration; or both at least one power level and at least one energy application duration at which the determined amounts of energy are supplied.

3. The apparatus of claim 1, wherein the at least one processor is configured to determine a value indicative of energy absorbable by the object at each of the plurality of MSEs, and determine the amount of energy and the at least one power supply protocol based on the determined value.

4. The apparatus of claim 1, wherein the at least one power supply protocol comprises a time delay applied between application of energy at a first MSE and application of energy at a second MSE from the subset of the plurality of MSEs.

5. The apparatus of claim 1, wherein the at least one power supply protocol comprises a maximum absorbed power limit.

6. The apparatus of claim 5, wherein the at least one processor is configured to select the at least one power supply protocol among protocols determining different limits to the maximum power absorbed.

7. The apparatus of claim 6, wherein different maximum power absorbed limits are selected for different MSEs.

8. The apparatus of claim 5, wherein the at least one processor is configured to cause supply of electromagnetic energy to one or more of the antennas such that the maximum absorbed power limit is not exceeded for any of the MSEs, for which a power supply protocol defining the maximum power absorbed limit was selected.

9. The apparatus of claim 5, wherein power supply protocols dictating different maximum absorbed power limits are selected for different MSEs in the subset, and the at least one processor is configured to cause supply of electromagnetic power to one or more of the antennas so that the maximum absorbed power limits determined for different MSEs in the subset are not exceeded for any of the subset of the plurality of MSEs.

10. The apparatus of claim 1, wherein the at least one processor is configured to select for different MSEs power supply protocols that differ in energy application time limits.

11. The apparatus of claim 10, wherein the at least one processor is configured to cause supply of electromagnetic power to one or more of the antennas in at least a subset of the plurality of MSEs so that the minimum energy application time limit is not exceeded for any of the subset of the plurality of MSEs.

12. The apparatus of claim 10, wherein the minimum energy application time limit is the same for all the MSEs in the subset.

13. The apparatus of claim 10, wherein protocols dictating different minimum energy application time limits are selected for different MSEs in the subset, and the at least one processor is configured to cause supply of electromagnetic power to one or more of the antennas such that the minimum energy application time limits determined to different MSEs in the subset are not exceeded for any of the subset of the plurality of MSEs.

\* \* \* \* \*